United States Patent
Yoshimi et al.

(10) Patent No.: US 7,462,381 B2
(45) Date of Patent: Dec. 9, 2008

(54) METHOD FOR PRODUCING BIREFRINGENT FILM

(75) Inventors: Hiroyuki Yoshimi, Ibaraki (JP); Yuuichi Nishikouji, Ibaraki (JP); Nao Murakami, Ibaraki (JP); Masaki Hayashi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 383 days.

(21) Appl. No.: 10/512,561

(22) PCT Filed: Apr. 24, 2003

(86) PCT No.: PCT/JP03/05230

§ 371 (c)(1),
(2), (4) Date: Oct. 25, 2004

(87) PCT Pub. No.: WO03/091767

PCT Pub. Date: Nov. 6, 2003

(65) Prior Publication Data

US 2005/0151906 A1 Jul. 14, 2005

(30) Foreign Application Priority Data

Apr. 26, 2002 (JP) ............... 2002-125346
Nov. 26, 2002 (JP) ............... 2002-341636

(51) Int. Cl.
*C09K 19/00* (2006.01)
*C09K 19/56* (2006.01)

(52) U.S. Cl. .............. 428/1.1; 428/1.3; 349/129; 252/299.01

(58) Field of Classification Search .............. 428/1.3, 428/1.1; 349/129; 252/299.01
See application file for complete search history.

(56) References Cited

U.S. PATENT DOCUMENTS

| | | | |
|---|---|---|---|
| 5,132,147 A | 7/1992 | Takiguchi et al. | 427/393.5 |
| 5,235,443 A | 8/1993 | Barnik et al. | 359/37 |
| 5,243,451 A | 9/1993 | Kanemoto et al. | 359/53 |
| 5,568,290 A | 10/1996 | Nakamura | 359/63 |
| 5,583,679 A | 12/1996 | Ito et al. | |
| 5,784,139 A | 7/1998 | Chigrinov et al. | 349/117 |
| 5,798,808 A | 8/1998 | Van Haaren et al. | 349/96 |
| 2006/0204678 A1 * | 9/2006 | Hayashi et al. | 428/1.3 |

FOREIGN PATENT DOCUMENTS

| | | |
|---|---|---|
| DE | 43 42 280 | 6/1995 |
| DE | 195 20 660 | 12/1996 |
| DE | 195 20 704 | 12/1996 |
| EP | 0 606 939 | 7/1994 |
| EP | 0 617 111 | 9/1994 |
| EP | 0 656 559 | 6/1995 |
| EP | 0 834 754 | 4/1998 |
| EP | 0911656 A2 | 4/1999 |
| EP | 1 160 591 | 12/2001 |
| EP | 1 452 892 | 9/2004 |
| JP | 61-162512 | 7/1986 |
| JP | 1-133003 | 5/1989 |
| JP | 3-9325 | 1/1991 |
| JP | 3-45906 | 2/1991 |
| JP | 3-67219 | 3/1991 |
| JP | 6-75114 | 3/1994 |
| JP | 6-75221 | 3/1994 |
| JP | 6075221 | 3/1994 |
| JP | 6-95066 | 4/1994 |
| JP | 6-300920 | 10/1994 |
| JP | 6-324333 | 11/1994 |
| JP | 6-331826 | 12/1994 |
| JP | 7-98411 | 4/1995 |
| JP | 7-146409 | 6/1995 |
| JP | 7-191217 | 7/1995 |
| JP | 8-511812 | 12/1996 |
| JP | 9-133810 | 5/1997 |
| JP | 10-508048 | 8/1998 |
| JP | 10-332933 | 12/1998 |
| JP | 2000-190385 | 7/2000 |
| JP | 2000-511296 | 8/2000 |
| JP | 2001-343529 | 12/2001 |
| JP | 2002-90527 A | 3/2002 |
| WO | WO94/24191 | 10/1994 |
| WO | WO96/11967 | 4/1996 |
| WO | WO97/44704 | 11/1997 |
| WO | WO 00/39631 | 7/2000 |
| WO | WO 03/040786 | 5/2003 |

OTHER PUBLICATIONS

Office Action of Corresponding Japanese Patent Application No. 2003-117462 mailed Sep. 20, 2006.
Office Action of Corresponding Taiwanese Patent Application No. 092109538 dated Jun. 12, 2007.

* cited by examiner

*Primary Examiner*—Geraldina Visconti
(74) *Attorney, Agent, or Firm*—Westerman, Hattori, Daniels & Adrian, LLP.

(57) ABSTRACT

A method of manufacturing a birefringent film is provided, by which a birefringent film including a liquid crystal compound birefringent layer and another birefringent layer can be manufactured so as to have a reduced thickness in a reduced number of process steps. In the manufacturing method, a non-liquid crystal polymer birefringent layer that has been subjected to an aligning treatment is used as an alignment layer for a liquid crystal compound. According to the manufacturing method, the process step of separately preparing an alignment layer and the need for the additional alignment layer can be eliminated, thereby allowing the total thickness of the birefringent film to be reduced.

31 Claims, 3 Drawing Sheets

METHOD FOR PRODUCING BIREFRINGENT FILM

TECHNICAL FIELD

The present invention relates to a method of manufacturing a birefringent film. Specifically, this invention relates to a method of manufacturing a birefringent film including a non-liquid crystal polymer birefringent layer and a liquid crystal compound birefringent layer.

BACKGROUND ART

In order to manufacture a birefringent film containing a liquid crystal compound, it is required that the liquid crystal compound be aligned and that its alignment state be fixed. In order for a liquid crystal compound to be aligned, conventionally, there has been the need for preparing an alignment film and coating the liquid crystal compound on the alignment film. Generally known examples of such an alignment film includes a rubbing film formed of a thin film of polyimide or polyvinyl alcohol rubbed with a rubbing cloth, an optical alignment film formed of a photo-dimerized polymer film irradiated with polarized light (see, for example, JP 6(1994)-95066 A), and a stretched polymer film formed of a stretched film of polyester or the like (see, for example, JP 3(1991)-9325 A). Further, there has also been a case where on a birefringent film of a liquid crystal compound formed on such an alignment film, another birefringent film further is laminated so as to enhance optical compensation. Known examples of such a film as another birefringent film include a birefringent film formed from a non-liquid crystal polymer (see, for example, JP 2000-190385 A).

However, when another birefringent film further is laminated on a birefringent film of a liquid crystal compound formed on an alignment film, the total thickness increases, which has been disadvantageous. Further, in this case, there is the need for preparing an alignment film (or an alignment base), thereby also increasing the number of total process steps in manufacturing, which has been disadvantageous.

DISCLOSURE OF THE INVENTION

In order to solve the above-mentioned problems, an object of the present invention is to provide a method of manufacturing a birefringent film by which a birefringent film having a small total thickness is manufactured in a reduced total number of process steps.

The present invention provides a method of manufacturing a birefringent film in which a liquid crystal compound birefringent layer is formed on a non-liquid crystal polymer birefringent layer. The liquid crystal compound birefringent layer is formed from an aligned liquid crystal compound, and the non-liquid crystal polymer birefringent layer is formed from a non-liquid crystal polymer. In the method, the non-liquid crystal polymer birefringent layer has been subjected to an aligning treatment, and due to alignment of the non-liquid crystal polymer birefringent layer, the liquid crystal compound birefringent layer is treated to be aligned while being formed.

BEST MODE FOR CARRYING OUT THE INVENTION

Figure 1:
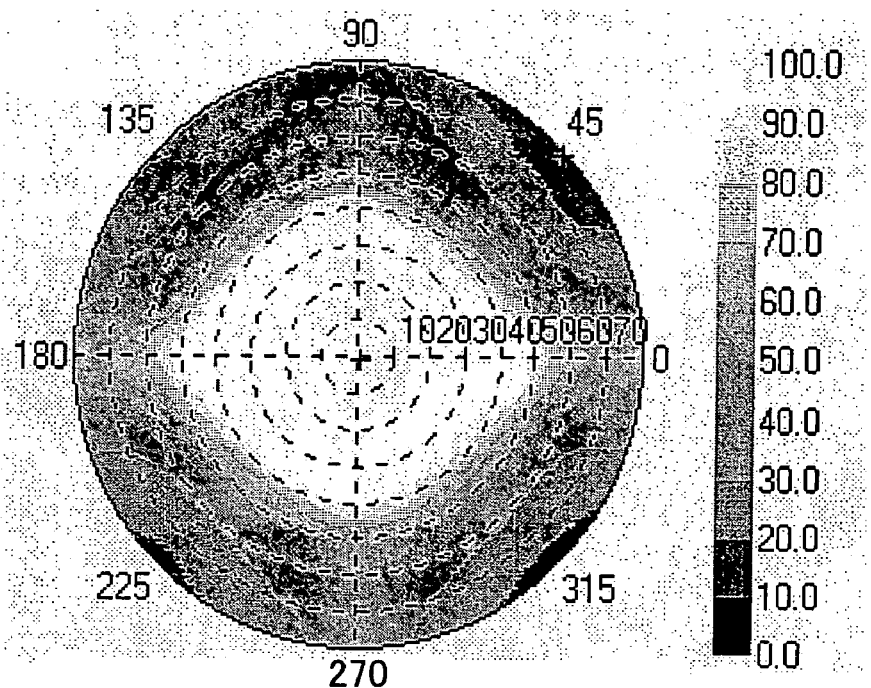
FIG. 1 shows a contrast curve of a liquid crystal panel of Example 1.

According to the manufacturing method of the present invention, the non-liquid crystal polymer birefringent layer has been subjected to an aligning treatment, and thus a liquid crystal compound coated on the non-liquid crystal polymer birefringent layer naturally can be aligned. Moreover, the non-liquid crystal polymer birefringent layer has a birefringent property, and thus further optical compensation also can be realized in practical use. That is, according to the conventional technique, as described above, while an alignment film is needed in order for a liquid crystal compound to be aligned, an additional birefringent film is needed so as to enhance an optical compensation capability. This has caused an increase in total thickness of a resultant film. However, in a film obtained by the manufacturing method according to the present invention, the non-liquid crystal polymer birefringent layer performs both a function as an alignment film and an optically compensating function, and thus the total thickness of a resultant film naturally can be reduced.

Furthermore, the non-liquid crystal polymer birefringent layer alone performs the function as an alignment film and the optically compensating function, and thus the number of manufacturing process steps can be smaller than in the conventional manufacturing method.

The non-liquid crystal polymer birefringent layer used in the manufacturing method according to the present invention can be formed of, for example, a non-liquid crystal polymer film subjected to an aligning treatment. A non-liquid crystal polymer film can be prepared, for example, in the following manners. That is, a non-liquid crystal polymer film available on the market may be used. Alternatively, it also may be possible to form a non-liquid crystal polymer film by coating a non-liquid crystal polymer solution or melt on the surface of a base and hardening it.

A method of preparing a non-liquid crystal polymer film in which a non-liquid crystal polymer is coated on the surface of a base and hardened is described as an example.

First, a non-liquid crystal polymer is coated on the surface of a base, and thus a coated layer is formed.

The non-liquid crystal polymer preferably is a polymer exhibiting a negative alignment birefringent property (a property of a polymer film such that when stretched, the polymer film has a decreased refractive index in a direction in which it is stretched) because of its excellent heat resistance, chemical resistance, transparency and hardness. As such a polymer, particularly polyamide, polyimide, polyester, polyetherketone, polyaryletherketone, polyamide imide, polyesterimide or the like is used preferably. It may be possible to use one of these polymers alone or a mixture of two or more polymers that have different functional groups, for example, a mixture of polyaryletherketone and polyamide. The non-liquid crystal polymer preferably has excellent light transmittance, which is, for example, 75% or higher and preferably 85% or higher.

Among these polymers, polyimide is most preferable because high transparency, alignment property, and stretchability can be obtained.

The molecular weight of the above-mentioned polymer is not particularly limited, but the weight-average molecular weight (Mw) thereof preferably ranges from 1,000 to 1,000, 000 and more preferably ranges from 2,000 to 500,000. The weight-average molecular weight was measured by gel permeation chromatography (GPC) using polyethylene oxide as a standard sample and a dimethylformamide solvent.

As the polyimide, it is preferable to use a polyimide that has a high in-plane alignment property and is soluble in an organic solvent. Specifically, for example, it is possible to use a polymer that contains a condensation polymer of 9,9-bis (aminoaryl)fluorene and an aromatic tetracarboxylic dianhydride disclosed in JP 2000-511296 A and at least one repeating unit represented by the formula (1) below.

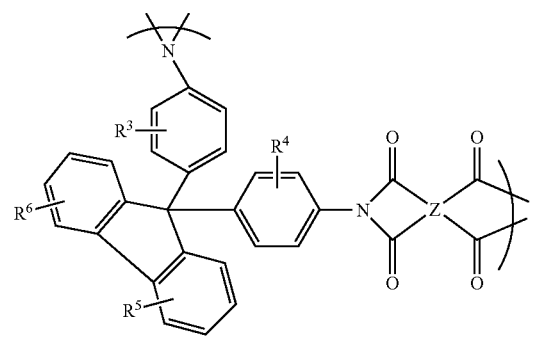

(1)

In the above formula (1), $R^3$ to $R^6$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group or a group represented by the formula (2) below.

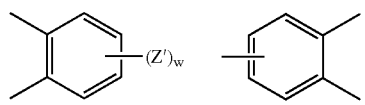

(2)

In the formula (2) above, Z' is, for example, a covalent bond, a $C(R^7)_2$ group, a CO group, an O atom, an S atom, an $SO_2$ group, an $Si(C_2H_5)_2$ group or an $NR^8$ group. When there are plural Z's, they may be the same or different. Also, w is an integer from 1 to 10. $R^7$s independently are hydrogen or $C(R^9)_3$. $R^8$ is hydrogen, an alkyl group having from 1 to about 20 carbon atoms or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

Other than the above, a homopolymer whose repeating unit is represented by the general formula (3) or (4) below or polyimide whose repeating unit is represented by the general formula (5) below disclosed in JP 8(1996)-511812 A may be used, for example. The polyimide represented by the formula (5) below is a preferable mode of the homopolymer represented by the formula (3) below.

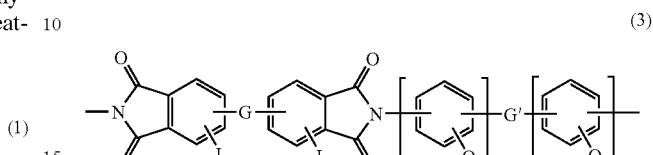

(3)

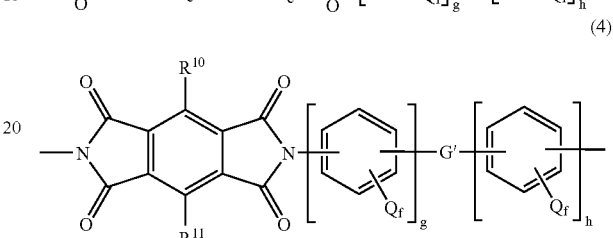

(4)

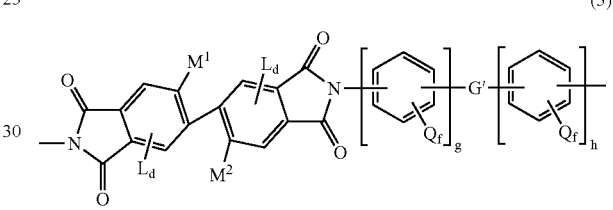

(5)

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. Further, d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. Further, f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above formula (5), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of polyimide represented by the formula (3) includes polyimide represented by the formula (6) below.

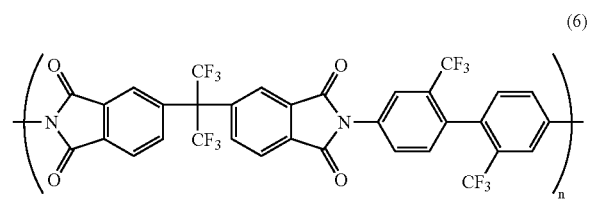

(6)

Moreover, the above-mentioned polyimide may be, for example, a copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalene-tetracarboxylic dianhydride, 1,2,5,6-naphthalene-tetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic dianhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2', 5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether or 4,4'-diaminodiphenylsulfone.

The polyetherketone may be, for example, polyaryletherketone represented by the general formula (7) below, which is disclosed in JP 2001-49110 A.

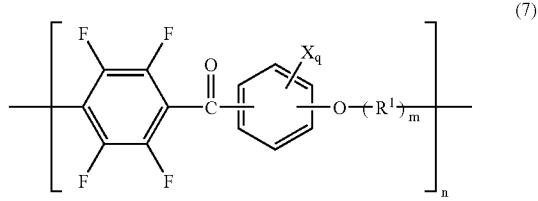

(7)

In the above formula (7), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ lower straight alkyl group or a $C_{1-6}$ lower branched alkyl group and more preferably is a $C_{1-4}$ straight or branched alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q is an integer from 0 to 4. In the formula (7), it is preferable that q=0 and a carbonyl group and an oxygen atom of ether that are bonded to both ends of a benzene ring are present at para positions.

Also, in the above formula (7), $R^1$ is a group represented by the formula (8) below, and m is an integer of 0 or 1.

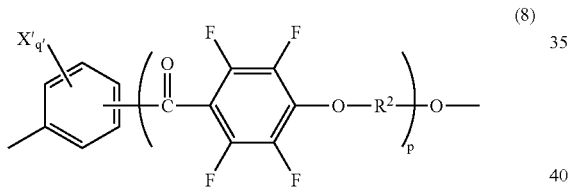

(8)

In the above formula (8), X' is a substituent and is the same as X in the formula (7), for example. In the formula (8), when there are plural X's, they may be the same or different. Further, q' indicates the number of substitutions in the X' and is an integer from 0 to 4, preferably, q'=0. In addition, p is an integer of 0 or 1.

In the formula (8), $R^2$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenyl ether or biphenyl sulfone. In these divalent aromatic groups, hydrogen that is bonded directly to the aromatic may be substituted with a halogen atom, a lower alkyl group or a lower alkoxy group. Among them, the $R^2$ preferably is an aromatic group selected from the group consisting of the formulae (9) to (15) below.

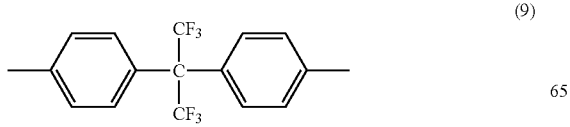

(9)

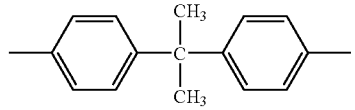

(10)

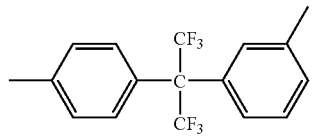

(11)

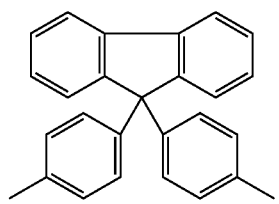

(12)

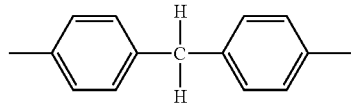

(13)

(14)

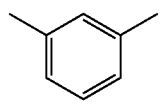

(15)

In the above formula (7), the $R^1$ preferably is a group represented by the formula (16) below, wherein $R^2$ and p are equivalent to those in the above-noted formula (8).

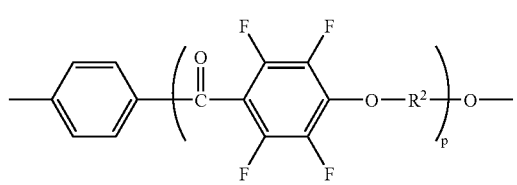

(16)

Furthermore, in the formula (7), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by, for example, the general formula (17) below. In the formula below, n indicates a degree of polymerization as in the formula (7).

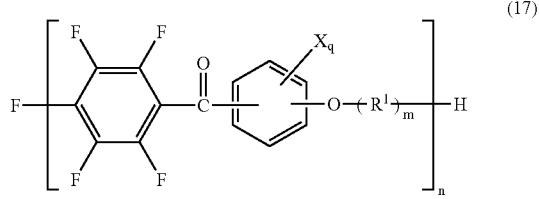

(17)

Specific examples of the polyaryletherketone represented by the formula (7) may include those represented by the formulae (18) to (21) below, wherein n indicates a degree of polymerization as in the formula (7).

halogen or hydrogen), a CO group, an O atom, an S atom, an $SO_2$ group, an $Si(R)_2$ group and an $N(R)$ group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a halogenated $C_{1-3}$ alkyl group, an alkoxy group represented by

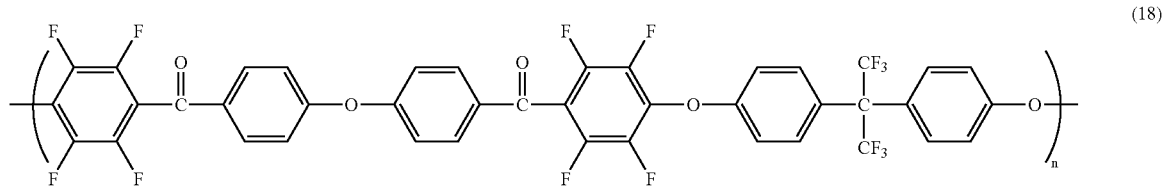

(18)

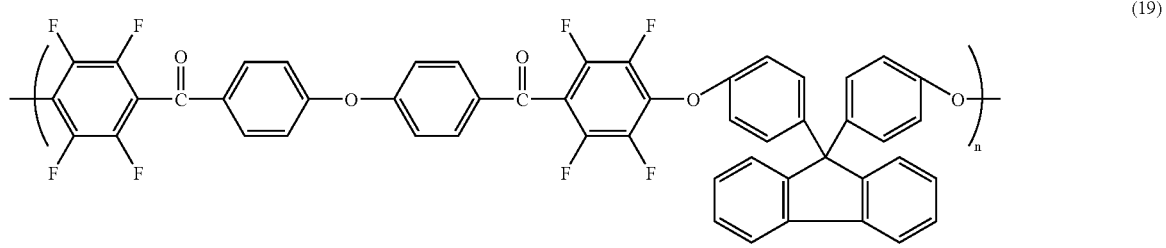

(19)

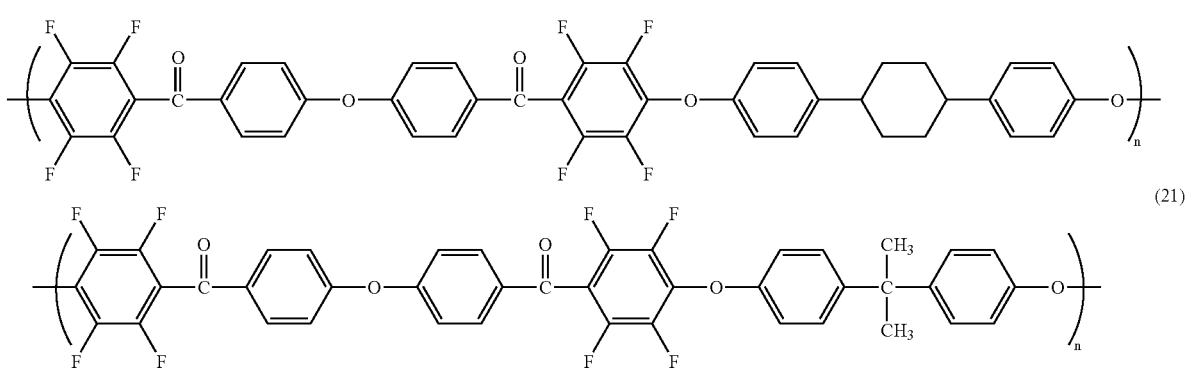

(20)

(21)

Other than the above, the polyamide or polyester may be, for example, polyamide or polyester described in JP 10(1998)-508048 A, and their repeating units can be represented by the general formula (22) below.

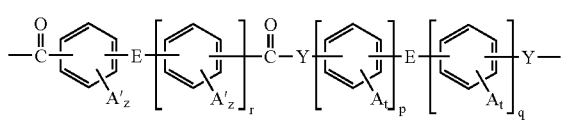

(22)

In the above formula (22), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is OR (wherein R is the group defined above), an aryl group, a substituted aryl group by halogenation or the like, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the formula (22) above, the repeating unit represented by the general formula (23) below is preferable.

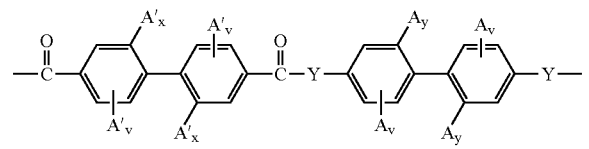

(23)

In the formula (23), A, A' and Y are those defined by the formula (22), and v is an integer from 0 to 3, preferably is an integer from 0 to 2. Although each of x and y is 0 or 1, not both of them are 0.

Furthermore, other than the above, the polyamide imide may be, for example, polyamide imide described in JP 61(1986)-162512 A.

There is no particular limit to the base, and an inorganic compound base (an SUS belt, a copper sheet, a glass sheet, an Si wafer or the like), a polymer film, a metal sheet or the like can be used.

Specifically, a material for forming the polymer film may be, for example, a polyolefin (polyethylene, polypropylene or the like), amorphous polyolefin, polyimide, polyamide imide, polyamide, polyetherimide, polyether ether ketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, polymethyl methacrylate, polymethacrylate, polyacrylate, polystyrene, polypropylene, polynorbornene, a cellulose-based polymer (triacetylcellulose (TAC) or the like), an epoxy resin, a phenol resin, a norbornene-based resin, a polyester resin, a polyether-sulfone resin, a polysulfone resin, a polycarbonate resin, a polyamide resin, a polyimide resin, a polyolefin resin, an acrylic resin, a polynorbornene resin, a polyarylate resin, a polystyrene resin, a polyvinyl alcohol resin, a polyvinyl chloride resin, a polyvinylidene chloride resin, a polyacrylic resin, a mixture of these materials or the like.

Furthermore, other than the above, a liquid crystal polymer or the like also can be used. Moreover, for example, a mixture formed of a thermoplastic resin whose side chain has a substituted or unsubstituted imido group and a thermoplastic resin whose side chain has a substituted or unsubstituted phenyl group and a nitrile group, which is described in JP 2001-343529 A (WO 01/37007) also can be used. Specific examples thereof include a mixture of an alternating copolymer of isobutene and N-methyl maleimide and an acrylonitrile-styrene copolymer.

Among these materials, for example, polyethylene, polypropylene, polyethylene terephthalate, polyethylene naphthalate, polymethyl methacrylate, polycarbonate, polyarylate, cellulose-based polymers, polyether sulfone, norbornene-based resins, a mixture of an alternating copolymer of isobutene and N-methyl maleimide and an acrylonitrile-styrene copolymer, a mixture formed of a thermoplastic resin whose side chain has a substituted or unsubstituted imido group and a thermoplastic resin whose side chain has a substituted or unsubstituted phenyl group and a nitrile group are preferable. Examples of the polymer film using this mixture include "HT film", trade name of Kaneka Corporation.

The polymer film can be manufactured using any of the above-mentioned resins by extrusion, a calender method, a solvent casting method or the like. Moreover, the polymer film also may be stretched (uniaxially, biaxially), and a stretched polymer film is preferable.

As the polymer film, a polymer film that has been subjected to a surface treatment such as, for example, a treatment for providing hydrophilicity, a treatment for providing hydrophobicity, or a treatment for reducing the solubility of a base also may be used. Further, a polarizer that will be described later also may be used.

The thickness of the polymer film is, generally not less than 10 μm and not more than 200 μm, preferably not less than 20 μm and not less than 150 μm, and most preferably not less than 30 μm and not more than 100 μm.

There is no particular limit to a method of coating the non-liquid crystal polymer on the surface of the base. Examples of the method include a method in which a non-liquid crystal polymer as described above is melted by heating and coated and a method in which a non-liquid crystal polymer solution, in which the non-liquid crystal polymer is dissolved in a solvent, is coated. Among these methods, the method in which a non-liquid crystal polymer solution is coated is preferable from the viewpoints of its excellent workability and optical anisotropy control.

There is no particular limit to the concentration of the non-liquid crystal polymer in the non-liquid crystal polymer solution. For example, in order to obtain the viscosity facilitating coating, with respect to 100 parts by weight of a solvent, the content of the non-liquid crystal polymer is, for example, 0.5 to 50 parts by weight, preferably 1 to 40 parts by weight, and most preferably 2 to 30 parts by weight. With respect to 100 parts by weight of a solvent, the content of the non-liquid crystal polymer preferably is not less than 0.5 parts by weight because this can provide the viscosity appropriate for coating. Further, the content of the non-liquid crystal polymer preferably is not more than 50 parts by weight because this can provide the viscosity that allows a smooth coated surface to be formed.

The solvent for the non-liquid crystal polymer solution is not particularly limited as long as it can dissolve the material such as the non-liquid crystal polymer or the like, and can be determined suitably according to a type of the material. Specific examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketones such as acetone, methyl ethyl ketone, methyl isobutyl ketone, cyclohexanone, cyclopentanone, 2-pyrrolidone and N-methyl-2-pyrrolidone; esters such as ethyl acetate and butyl acetate; alcohols such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amides such as dimethylformamide and dimethylacetamide; nitriles such as acetonitrile and butyronitrile; ethers such as diethyl ether, dibutyl ether and tetrahydrofuran; or carbon disulfide, ethyl cellosolve or butyl cellosolve. These solvents may be used alone or in combination of two or more. Further, preferably, the solvent is of a type that does not corrode the base.

In the non-liquid crystal polymer solution, for example, various additives such as a stabilizer, a plasticizer, metal and the like further may be blended as necessary.

Moreover, the non-liquid crystal polymer solution may contain other resins as long as the alignment property or the like of the material does not drop considerably. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA:nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic resins, novolac resins or the like.

When the above-described other resins or the like are blended in the non-liquid crystal polymer solution as mentioned above, the blend amount ranges, for example, from 0 wt % to 50 wt %, preferably from 0 wt % to 30 wt %, with respect to the non-liquid crystal polymer.

The coating of the non-liquid crystal polymer solution can be carried out by a suitable method such as spin coating, roller coating, flow coating, die coating, blade coating, printing, dip coating, film flow-expanding, bar coating, gravure printing, extrusion or the like. In the coating, polymer layers can be superimposed as required.

There is no particular limit to the non-liquid crystal polymer melt. Examples of the melt include a melt in which a non-liquid crystal polymer as described above is melted by heating. A method of coating the non-liquid crystal polymer melt is not limited as long as it enables coating on the surface of the base. Examples of the method include a casting method and a melting extrusion method. The non-liquid crystal polymer melt further may contain, for example, various additives such as the above-mentioned stabilizer, plasticizer, metal and the like and other resins as required.

Next, the coated layer of the non-liquid crystal polymer on the base is hardened, and thus a non-liquid crystal polymer film is formed.

The hardening method is not particularly limited as long as it allows the non-liquid crystal polymer to be hardened so as to form the non-liquid crystal polymer film. Examples of the method include air-drying and drying by heating. The conditions under which the hardening is carried out also can be determined suitably according to, for example, the type of the non-liquid crystal polymer, and in the case of using a solution, the type of the solvent. For example, a temperature at which the hardening is carried out is generally from 25° C. to 400° C., preferably from 60° C. to 300° C., and more preferably from 65° C. to 250° C. The hardening may be carried out at a constant temperature or a temperature raised or lowered in a step-wise manner. A hardening time also is not limited. In the case of using a non-liquid crystal polymer solution, it is necessary to employ a condition that allows a solvent to be removed by hardening. The hardening time is, generally 10 seconds to 60 minutes, and preferably 30 seconds to 30 minutes.

A non-liquid crystal polymer film can be formed on the base in the above-described manner. It also is possible to obtain the non-liquid crystal polymer film alone by removing the base by peeling from the non-liquid crystal polymer film.

The birefringence is expressed by $\Delta n=[\{(nx+ny)/2\}-nz] \cdot d/d$, and the in-plane retardation is expressed by $Re=(nx-ny) \cdot d$. In the above-mentioned expressions, nx, ny and nz denote refractive indices in the directions of an X axis, Y axis and Z axis in the non-liquid crystal polymer film, respectively. The X axis denotes an axial direction presenting a maximum refractive index within the plane of the non-liquid crystal polymer film, the Y axis denotes an axial direction perpendicular to the X axis within the plane of the non-liquid crystal polymer film, and the Z axis denotes a thickness direction perpendicular to the X axis and the Y axis.

Next, the non-liquid crystal polymer film is subjected to an aligning treatment. The aligning treatment can be performed by any of stretching, shrinking, and rubbing. This aligning treatment by stretching or shrinking allows a non-liquid crystal polymer in the non-liquid crystal polymer film to be aligned, so that the non-liquid crystal polymer film is turned into a non-liquid crystal polymer birefringent layer exhibiting optical biaxiality such as, for example, characteristics expressed by nx>ny>nz. By rubbing, the non-liquid crystal polymer film remains a birefringent layer exhibiting optical uniaxiality, namely, characteristics expressed by nx=ny>nz.

The method of stretching the non-liquid crystal polymer film is not particularly limited, and ordinary methods can be applied. Examples include tenter transverse stretching, biaxial stretching, and stretching along a machine direction according to methods using rollers. It is preferable in the biaxial stretching that the stretch ratio in the long axis direction is lower than that in the short axis direction. The biaxial stretching can be selected from simultaneous biaxial stretching that uses a tenter alone, and a sequential biaxial stretching that uses rollers and a tenter. Heating in the stretching along a machine direction according to methods using rollers can be performed by a method selected from a method using heating rollers, a method in which an ambient atmosphere is heated, and a method in which both of these methods are carried out. Further, it also is possible to control an alignment angle by diagonal stretching.

Though the stretch ratio of the non-liquid crystal polymer film varies depending on the stretching method, it is 1% to 100% and preferably 3% to 50%.

The temperature for stretching the non-liquid crystal polymer film is selected suitably corresponding to, for example, the glass transition point (Tg) of the film and the types of additives in the non-liquid crystal polymer film. The temperature for stretching the non-liquid crystal polymer film is, for example, 80° C. to 250° C., and preferably 100° C. to 200° C. It is particularly preferable that the temperature for stretching the non-liquid crystal polymer film is substantially equal to or higher than Tg of the non-liquid crystal polymer film.

The method of shrinking the non-liquid crystal polymer film is not particularly limited, and ordinary methods can be applied. The examples include a method in which a non-liquid crystal polymer film is formed using a base, and the base on which the non-liquid crystal polymer film has been formed is heated or cooled so as to be shrunk. Such a base can be a base having shrinkability such as a heat-shrinkable film or the like. In the case of using a base having shrinkability, it is preferable to control the shrinkage ratio of the base using a stretcher. Specifically, this can be carried out by, for example, a method using a tenter stretcher, in which the stretch ratio is set to less than 1, and a method using a longitudinal uniaxial stretcher, in which the stretch ratio is set so that no stretching is carried out, thereby achieving shrinking in width.

The method of rubbing the non-liquid crystal polymer film is not particularly limited, and ordinary methods can be applied. Examples include a method in which the surface of a non-liquid crystal polymer film is rubbed in a predetermined direction using a woven fabric, felt, rubber, a brush or the like. The conditions under which rubbing is carried out, such as a pressure used for rubbing or the number of times of rubbing to be carried out, are not particularly limited.

As described above, by carrying out an aligning treatment by stretching, shrinking or the like, the non-liquid crystal polymer film is turned into a non-liquid crystal polymer birefringent layer. The non-liquid crystal polymer birefringent layer thus obtained exhibits excellent accuracy of an alignment axis in the plane. For example, variations of the alignment axis are, generally not more than ±0.5 degrees, and preferably not more than ±0.3 degrees. Further, the in-plane retardation Re is, generally Re≦250 nm, preferably 1 nm≦Re≦200 nm, and more preferably 5 nm≦Re≦150 nm. Further, a retardation Rz in a thickness direction is, generally Rz≦500 nm, preferably 2 nm≦Rz≦400 nm, and more preferably 10 nm≦Rz≦300 nm. Herein, Rz=(nx−nz)·d, and the respective definitions of nx, nz, d, and Re are the same as described above.

Advantageously, the non-liquid crystal polymer birefringent layer satisfies conditions represented by expressions (I) and (II) below, $$0(nm) \leq Re \leq 200(nm) \tag{I}$$

$$40(nm) \leq Rz \leq 800(nm) \tag{II}$$

where $$Re = (nx - ny) \cdot d,$$

$$Rz = (nx - nz) \cdot d,$$

nx, ny and nz denote refractive indices in directions of an X axis, Y axis and Z axis in the non-liquid crystal polymer birefringent layer, respectively, the X axis denotes an axial direction presenting a maximum refractive index within a plane of the non-liquid crystal polymer birefringent layer, the Y axis denotes an axial direction perpendicular to the X axis within the plane, the Z axis denotes a thickness direction perpendicular to the X axis and the Y axis, and d denotes a thickness of the non-liquid crystal polymer birefringent layer.

Furthermore, the thickness of the non-liquid crystal polymer birefringent layer can be determined suitably according to the size of a screen of an image display to which the layer is applied. A non-liquid crystal polymer birefringent layer having a thickness of, for example, 1 μm to 20 μm, and preferably 2 μm to 10 μm is used.

In the manufacturing method according to the present invention, for example, after the coated layer of a non-liquid crystal polymer is hardened on the base, without removing the base by peeling, the above-described aligning treatment is carried out with respect to a laminated body of the non-liquid crystal polymer film and the base, and thus a non-liquid crystal polymer birefringent layer can be formed on the base.

Furthermore, the manufacturing method according to the present invention may include a process step in which a laminated body of the base (hereinafter, referred to as a "first base") and the non-liquid crystal polymer film that is formed directly on the first base further is bonded onto another base (hereinafter, referred to as a "second base") so that the non-liquid crystal polymer film faces the second base, and then only the first base is peeled off. In this manner, the non-liquid crystal polymer film is transferred to the second base, and the first base is peeled off. With respect to a laminated body of the non-liquid crystal polymer film and the second base thus formed, an aligning treatment is carried out, and thus a non-liquid crystal polymer birefringent layer can be formed on the base.

Next, on the non-liquid crystal polymer birefringent layer thus obtained, a liquid crystal compound birefringent layer formed from an aligned liquid crystal compound is formed. In order to form a liquid crystal compound birefringent layer formed from an aligned liquid crystal compound, for example, a liquid crystal compound solution is coated on a non-liquid crystal polymer birefringent layer that has been subjected to the aligning treatment.

There is no particular limit to a liquid crystal compound solution as long as it contains a liquid crystal compound.

There is no particular limit to a liquid crystal compound. For example, a liquid crystal polymer, a photo- or thermally polymerizable liquid crystal monomer, a mixture thereof and the like can be used. Further, these compounds may be used alone or in the form of a mixture of two or more. Examples of the liquid crystal polymer include a nematic liquid crystal (a nematic liquid crystal containing a chiral liquid crystal), a discotic liquid crystal, and a cholesteric liquid crystal (for example, a cholesteric liquid crystal having a property of selective reflection with respect to circularly polarized light in the visible light region).

Examples of a nematic liquid crystal include nematic liquid crystals described respectively in JP 6(1994)-75114 A, JP 6(1994)-300920 A, and JP 6(1994)-331826 A.

Examples of a discotic liquid crystal include discotic liquid crystals described respectively in JP 7(1995)-98411 A, JP 7(1995)-146409 A, and JP 7(1995)-191217 A.

Examples of a cholesteric liquid crystal or a nematic liquid crystal containing a chiral liquid crystal include liquid crystals described respectively in JP 3(1991)-67219 A, the publication of U.S. Pat. No. 5,798,808, and the International Publication WO00/39631.

Examples of a cholesteric liquid crystal having a property of selective reflection with respect to circularly polarized light in the visible light region include cholesteric liquid crystals described respectively in JP 1(1989)-133003 A, JP 3(1991)-45906 A, JP 6(1994)-324333 A, and JP 9(1997)-133810 A.

Particularly, a nematic liquid crystal monomer is preferable. More specifically, a monomer represented by the formula (24) below can be used. The liquid crystal monomer may be one type or a combination of two or more types.

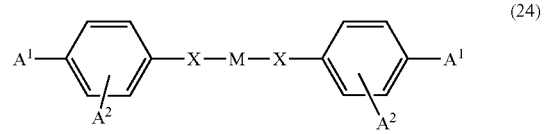

(24)

In the formula (24) above, $A^1$ and $A^2$ represent each a polymerizable group and may be identical or different.

Further, one of $A^1$ and $A^2$ may be a hydrogen atom.

X represents each a single bond, —O—, —S—, —C≡N—, —O—CO—, —CO—O—, —O—CO—O—, —CO—NR—, —NR—CO—, —NR—, —O—CO—NR—, —NR—CO—O—, —CH₂—O— or —NR—CO—NR, in which R represents a hydrogen atom or a $C_1$-$C_4$-alkyl group, and M represents a mesogenic group.

In the formula (24) above, Xs may be identical or different but preferably are identical.

In the monomer of the formula (24) above, $A^2$ preferably is ortho to $A^1$ at each occurrence.

Further, it is preferable that $A^1$ and $A^2$ mentioned above are each, independently of one another, represented by the formula below.

$$Z\text{-}X\text{-}(Sp)_n \tag{25}$$

It is preferable that $A^1$ and $A^2$ are identical.

In the formula (25) above,

Z represents a crosslinkable group,

X is similar to that of the formula (24) above,

Sp represents a spacer formed of a straight-chain or branched chain alkyl group having 1 to 30 carbon atoms. The alkyl group may be interrupted by an oxygen atom in an ether functional group, a sulfur atom in a thioether functional group, a nonadjacent imino group or $C_1$-$C_4$-alkylimino groups, for example.

Further, n is 0 or 1.

In the formula (25) above, it is preferable that Z is any of the radicals represented by the formulae below. In the formulae below, R is, for example, methyl, ethyl, n-propyl, i-propyl, n-butyl, i-butyl or t-butyl.

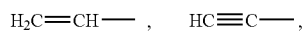

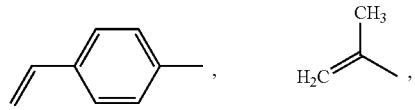 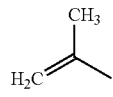

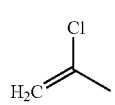 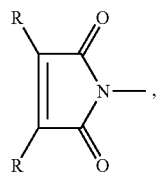

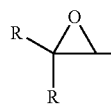

Also, in the formula (25) above, it is preferable that Sp is any of the radicals represented by the formulae below. In the formulae below, it is preferable that m is 1 to 3 and p is 1 to 12.

-continued

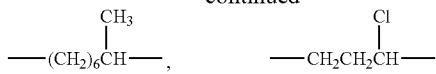

In the formula (24) above, it is preferable that M is represented by formula (26) below. In the formula (26) below, X is similar to X in the formula (24) above. Q represents, for example, a substituted or unsubstituted alkylene group or aromatic hydrocarbon radicals, or may be, for example, a substituted or unsubstituted straight-chain or branched chain $C_1$-$C_{12}$-alkylene group or the like.

(26)

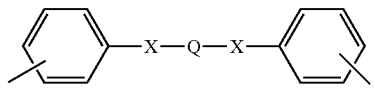

When Q is the aromatic hydrocarbon radicals, the radicals represented by the formulae below or substituted analogs thereof are preferable, for example.

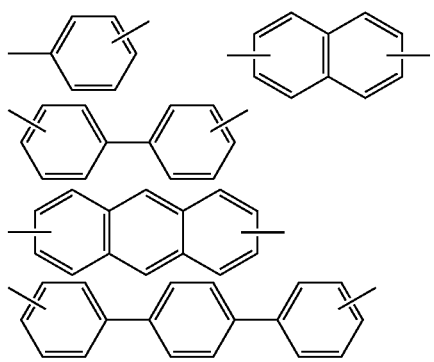

Substituted analogs of the aromatic hydrocarbon radicals represented by the formulae above may carry 1 to 4 substituents per aromatic ring, for example, or one or two substituents per aromatic ring or per group. The substituents may be identical or different. The substituents can be, for example, a $C_1$-$C_4$-alkyl group, a nitro group, a halogen atom such as of fluorine, chlorine, bromine, iodine or the like, a phenyl group or a $C_1$-$C_4$-alkoxy group.

Specific examples of the liquid crystal monomer can include monomers represented by the formulae (27) to (42) below.

(27)

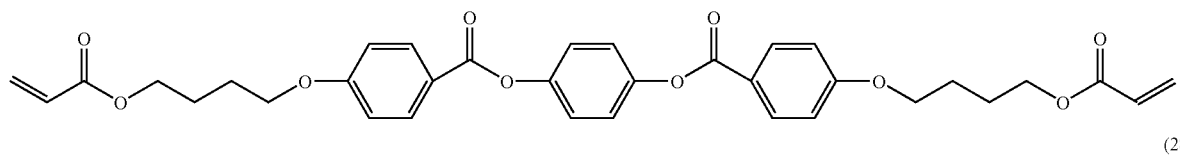

(28)

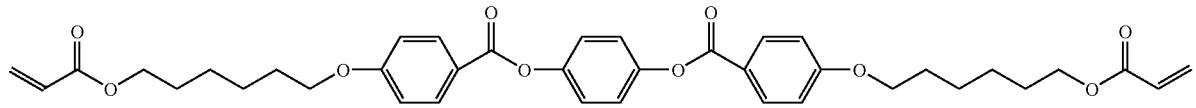

-continued
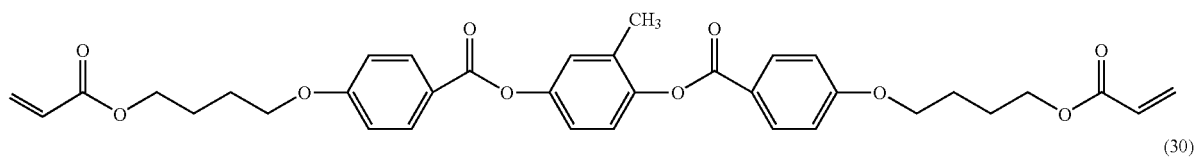
(29)
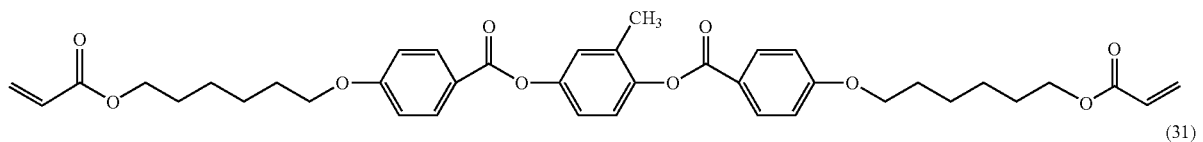
(30)
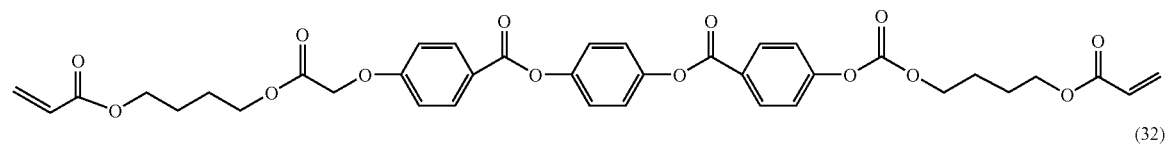
(31)
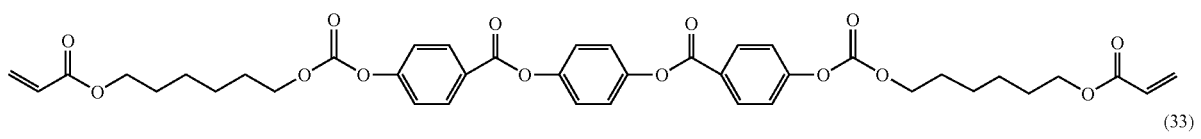
(32)
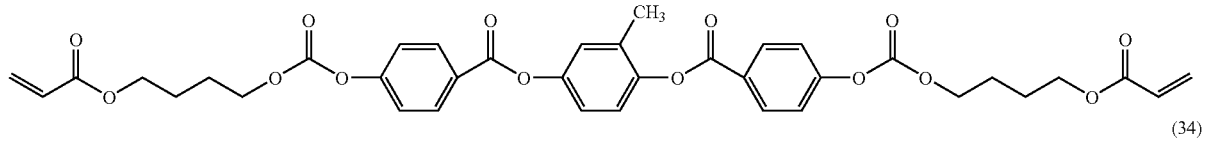
(33)
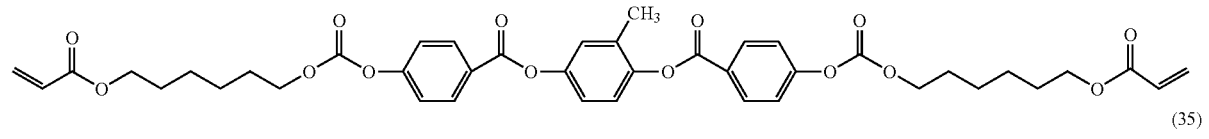
(34)
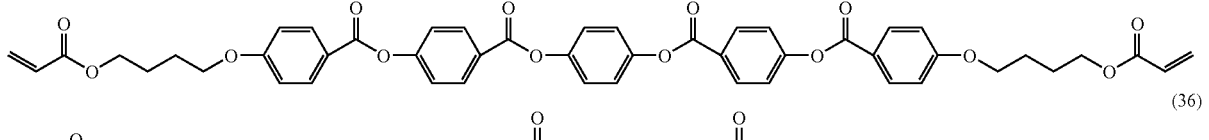
(35)
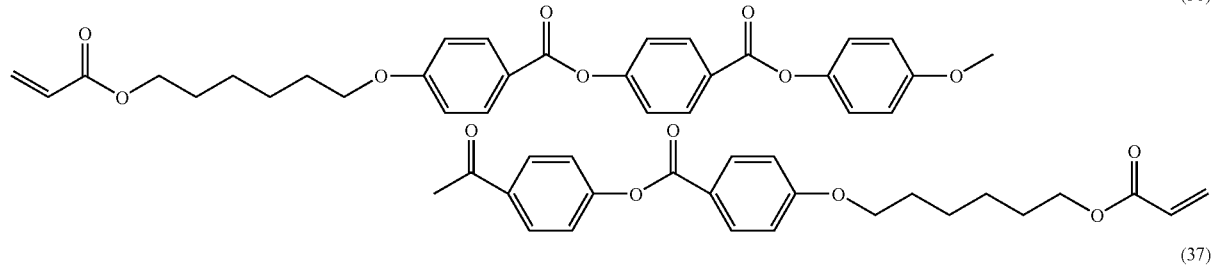
(36)
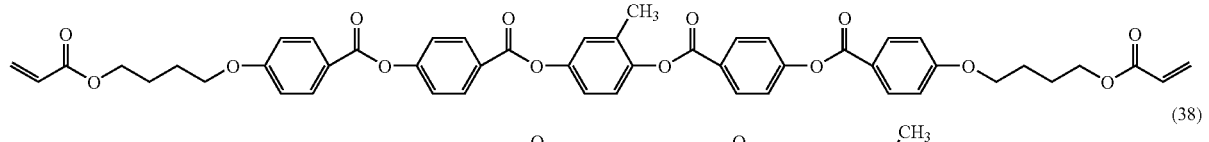
(37)
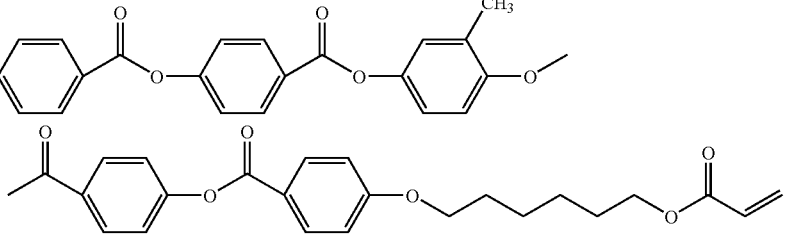
(38)

-continued

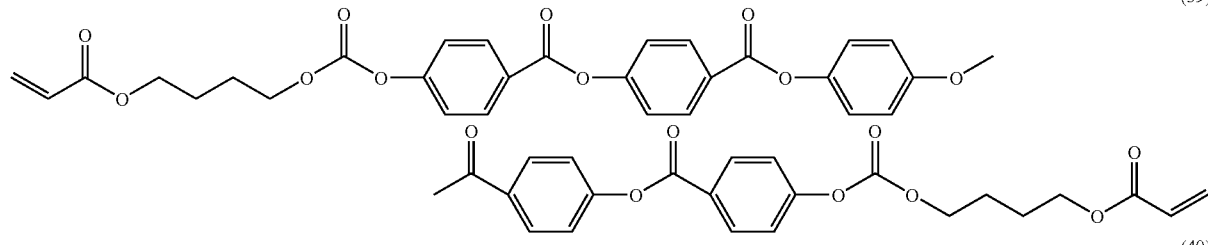

(39)

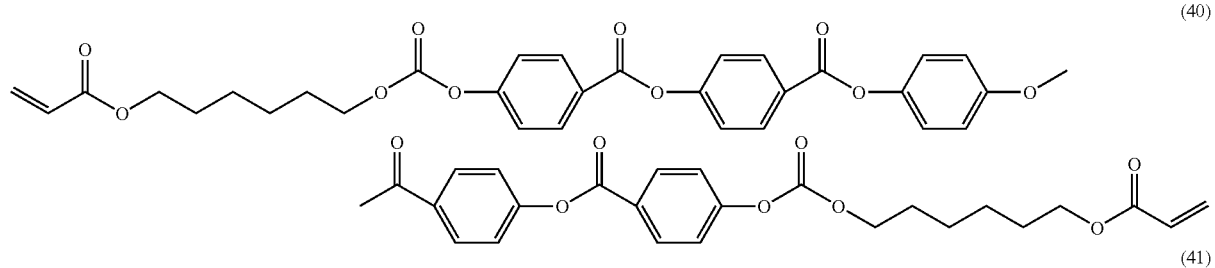

(40)

(41)

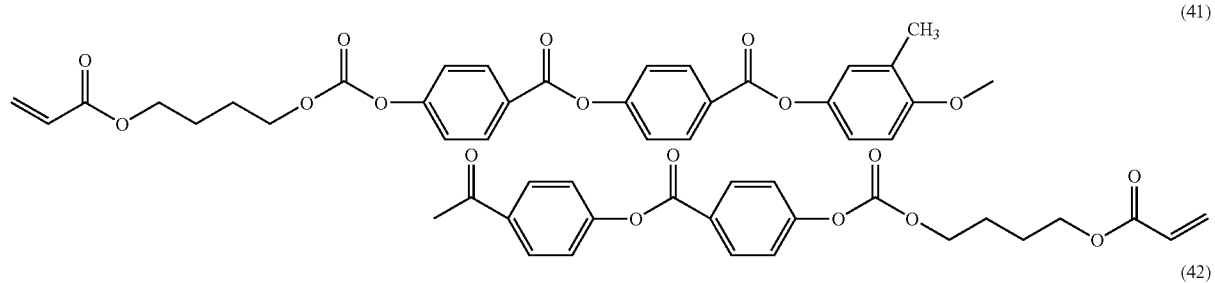

(42)

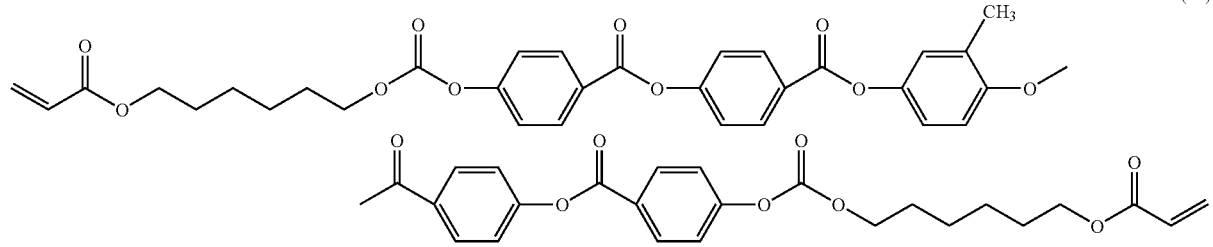

The temperature range in which the liquid crystal monomer shows a liquid crystal property varies depending on their types but preferably ranges from 40° C. to 120° C., for example, more preferably ranges from 50° C. to 100° C. and particularly preferably ranges from 60° C. to 90° C.

It is preferable that the liquid crystal monomer is represented by the above-mentioned chemical formula (24). Although such liquid crystal monomers generally are nematic liquid crystal monomers, the liquid crystal monomer of the present invention is given a twist by a chiral dopant that will be described later and eventually achieves a cholesteric structure.

The liquid crystal compound solution contains preferably a chiral dopant. In the present invention, the chiral dopant is, for example, a compound functioning to align liquid crystal compounds of a liquid crystal monomer and a liquid crystal polymer to have a cholesteric structure.

The chiral dopant is not particularly limited in type as long as it can align constituent molecules of a cholesteric layer to have a cholesteric structure. Examples thereof are shown below.

The polymerizable chiral dopant can be, for example, chiral compounds represented by the general formulae (43) to (46) below.

$(Z-X^5)_n Ch$ (43)

$(Z-X^2-Sp-X^5)_n Ch$ (44)

$(P^1-X^5)_n Ch$ (45)

$(Z-X^2-Sp-X^3-M-X^4)_n Ch$ (46)

In the above formulae,

Z is similar to that in the formula (25) above,

Sp is similar to that in the formula (25) above, $X^2$, $X^3$ and $X^4$ are each, independently of one another, a chemical single bond, —O—, —S—, —O—CO—, —CO—O—, —O—CO—O—, —CO—NR—, —NR—CO—, —O—CO—NR—, —NR—CO—O— or —NR—CO—NR—, and the R represents a hydrogen atom or a $C_1$-$C_4$-alkyl group.

Further, $X^5$ represents a chemical single bond, —O—, —S—, —O—CO—, —CO—O—, —O—CO—O—, —CO—NR—, —NR—CO—, —O—CO—NR—, —NR—CO—O—, —NR—CO—NR, —CH$_2$O—, —O—CH$_2$—, —CH=N—, —N=CH— or —N=N—. Similarly to the above, the R represents a hydrogen atom or a $C_1$-$C_4$-alkyl group.

Similarly to the above, M represents a mesogenic group.

P¹ represents a hydrogen atom, a $C_1$-$C_{30}$-alkyl group, a $C_1$-$C_{30}$-acyl group or a $C_3$-$C_8$-cycloalkyl group substituted by 1 to 3 of $C_1$-$C_6$-alkyl, and n is an integer from 1 to 6.

Ch represents an n-valent chiral group.

In the formula (46) above, it is preferable that at least one of $X^3$ and $X^4$ be —O—CO—O—, —O—CO—NR—, —NR—CO—O— or —NR—CO—NR—.

In the formula (45) above, when P¹ is an alkyl group, an acyl group or a cycloalkyl group, its carbon chain may be interrupted by an oxygen atom in an ether functional group, a sulfur atom in a thioether functional group or nonadjacent imino or $C_1$-$C_4$-alkylimino groups, for example.

Examples of the above-noted chiral group of Ch include radicals represented by the formulae below.

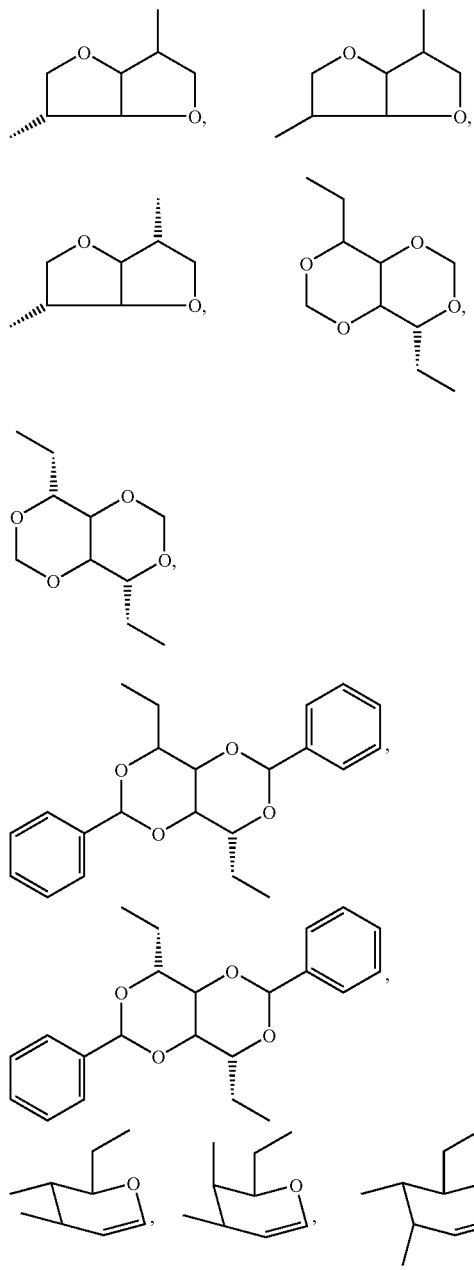

-continued

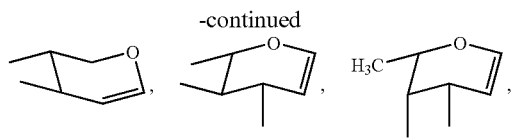

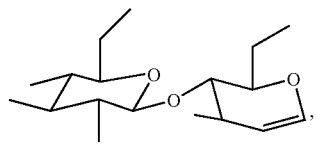

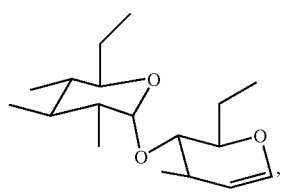

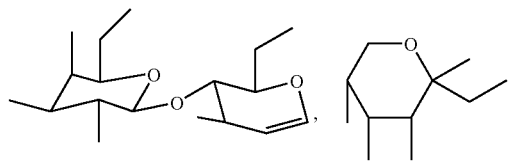

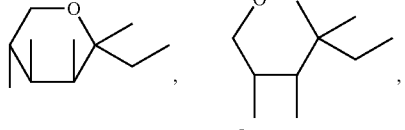

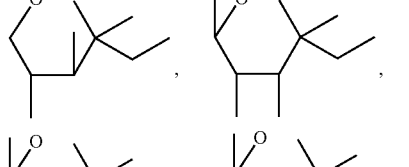

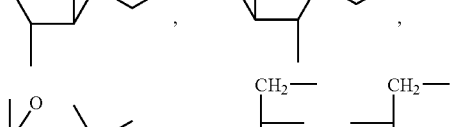

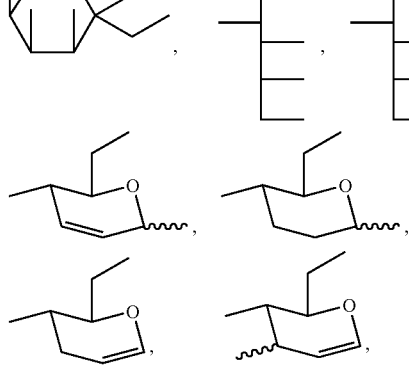

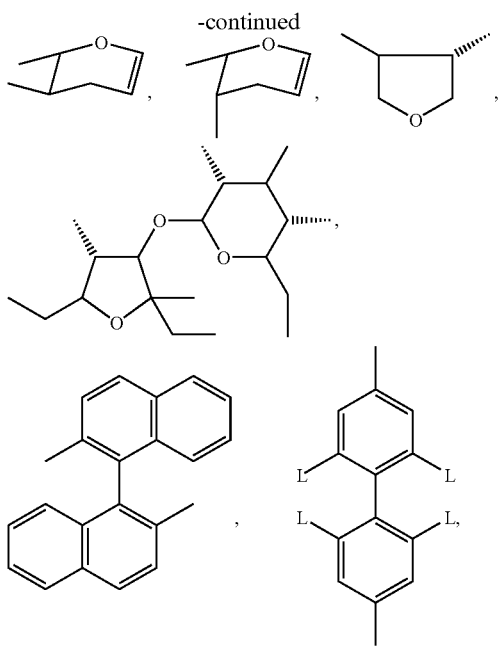

In the above radicals, L is a $C_1$-$C_4$-alkyl group, a $C_1$-$C_4$-alkoxy group, a halogen atom, COOR, OCOR, CONHR or NHCOR, and the R represents a $C_1$-$C_4$-alkyl group. Terminal ends in the radicals represented by the formulae above indicate dangling bonds with the adjacent groups.

Among the above radicals, radicals represented by the formulae below are particularly preferable.

It is preferable that the chiral compound represented by the formula (44) or (46) above is, for example, a radical in which n is 2, Z represents $H_2C=CH-$ and Ch is represented by any of the formulae below.

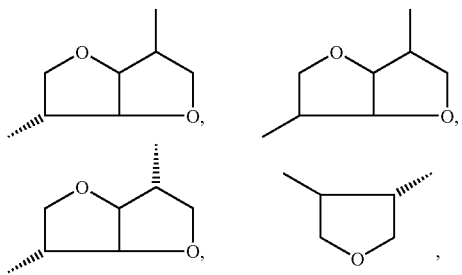

Specific examples of the chiral compound can include compounds represented by the formulae (47) to (67) below. Incidentally, these chiral compounds have a helical twisting power of at least $1\times10^{-6}$ $nm^{-1}\cdot(wt\%)^{-1}$.

(47)

(48)

-continued
(49)
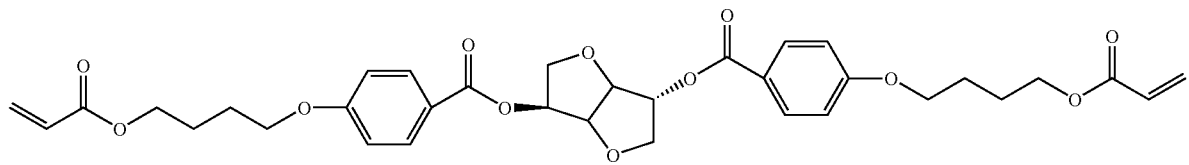
(50)
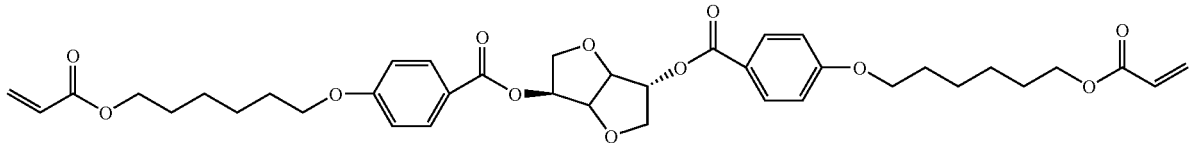
(51)
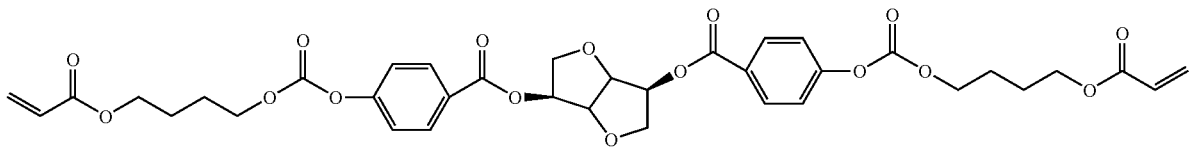
(52)
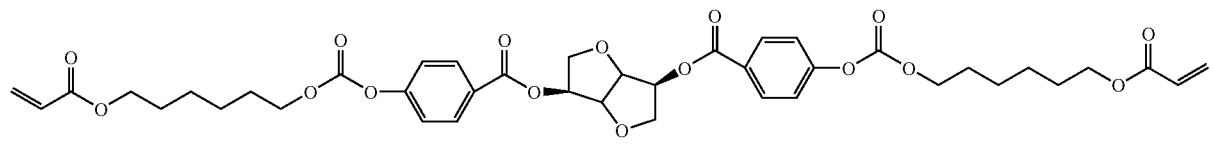
(53)
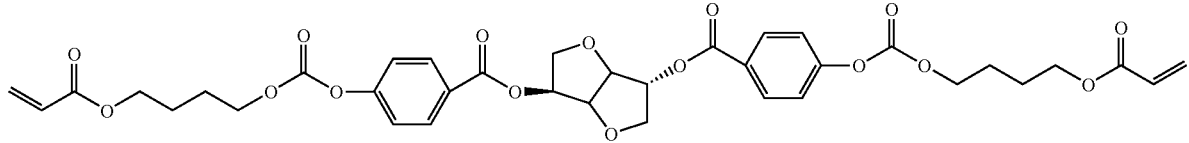
(54)
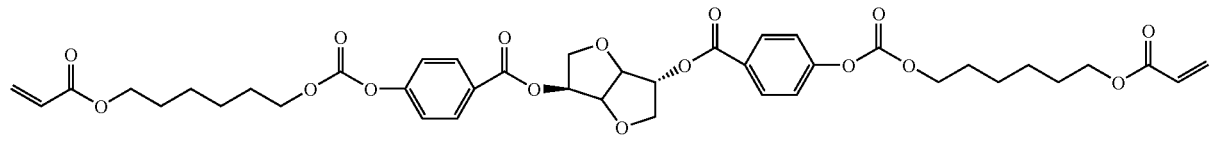
(55)
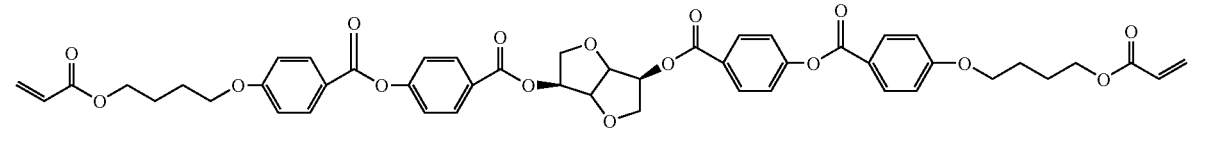
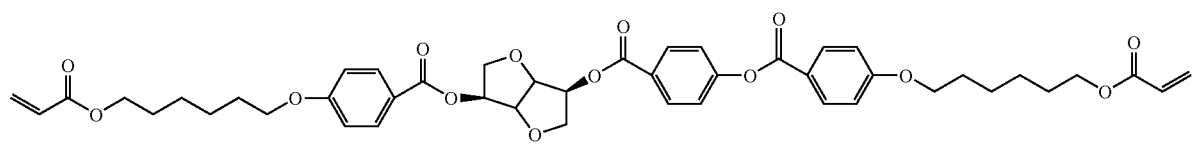

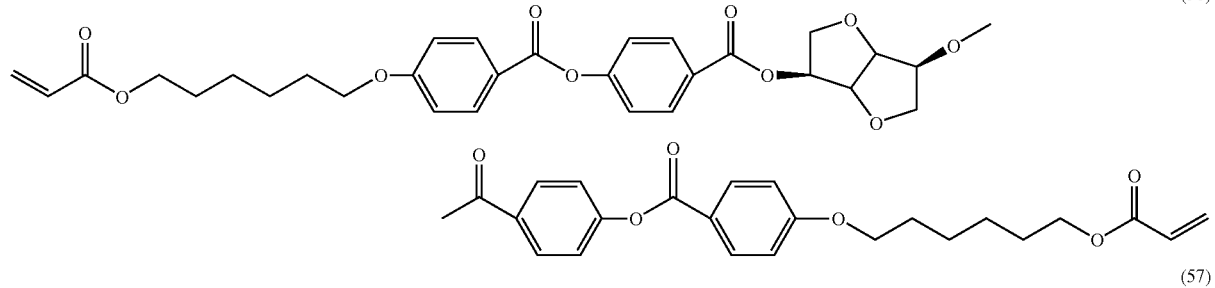
(56)
(57)
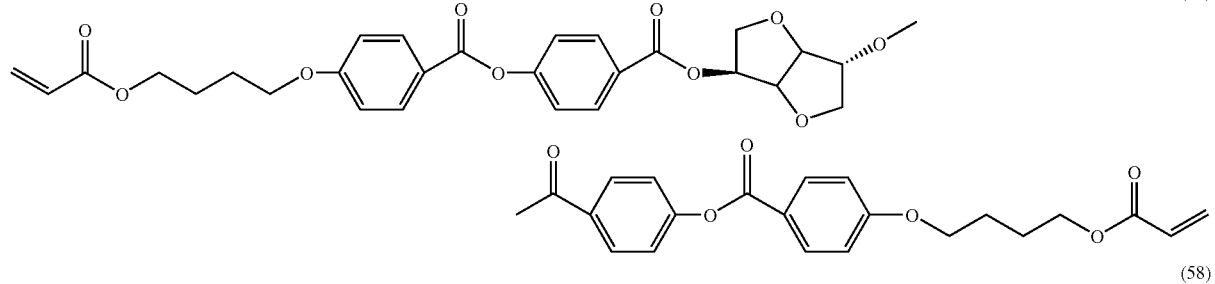
(58)
(59)
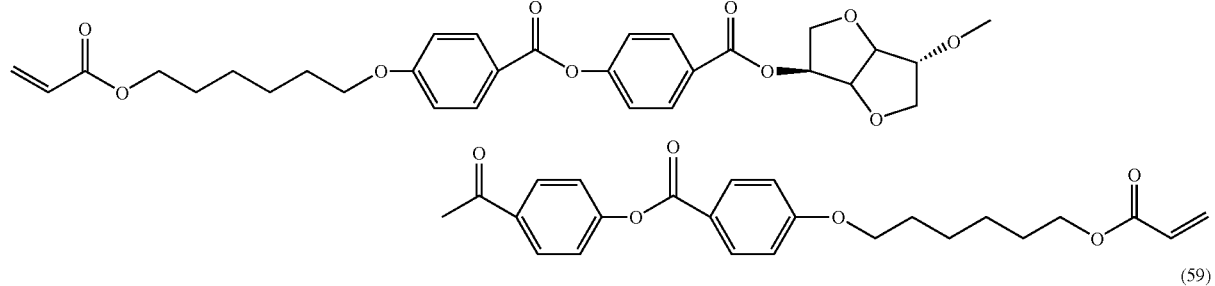
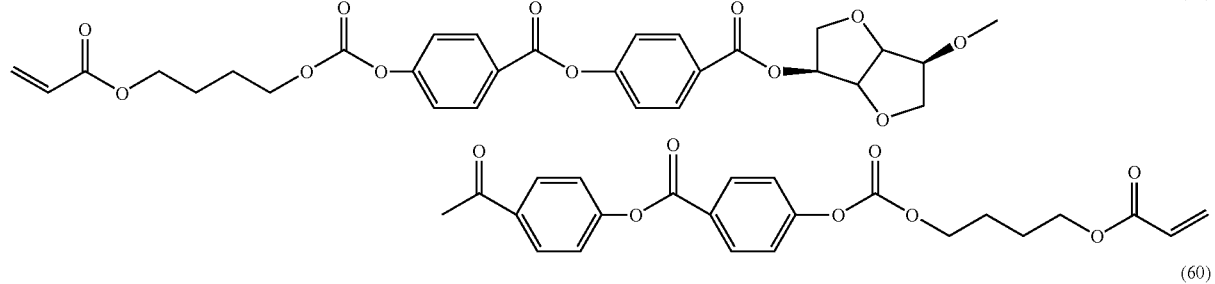
(60)
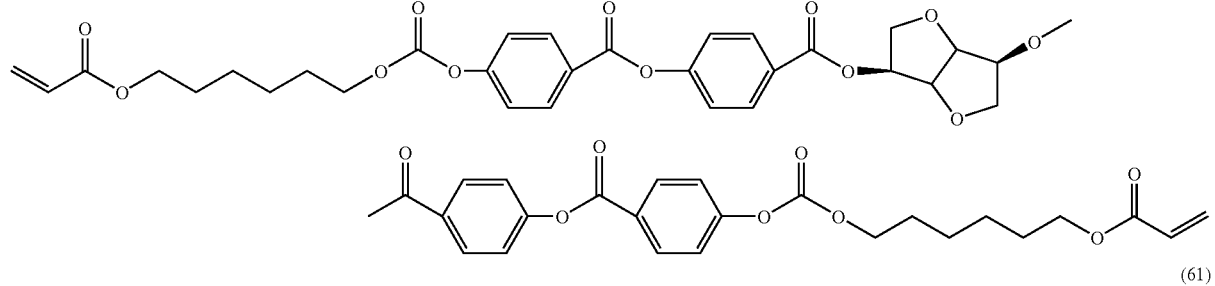
(61)
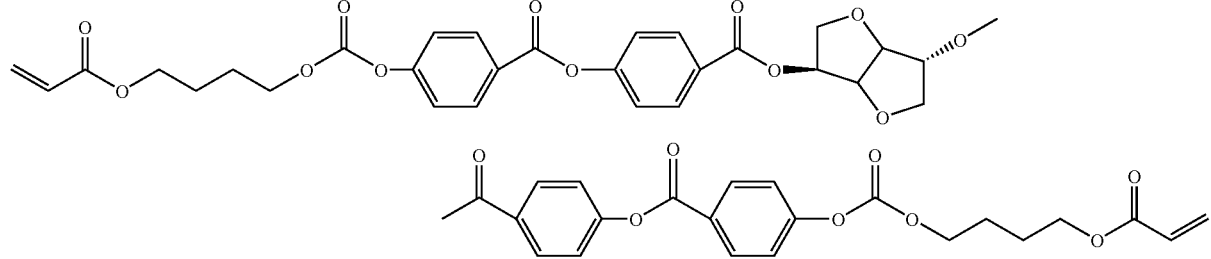

-continued
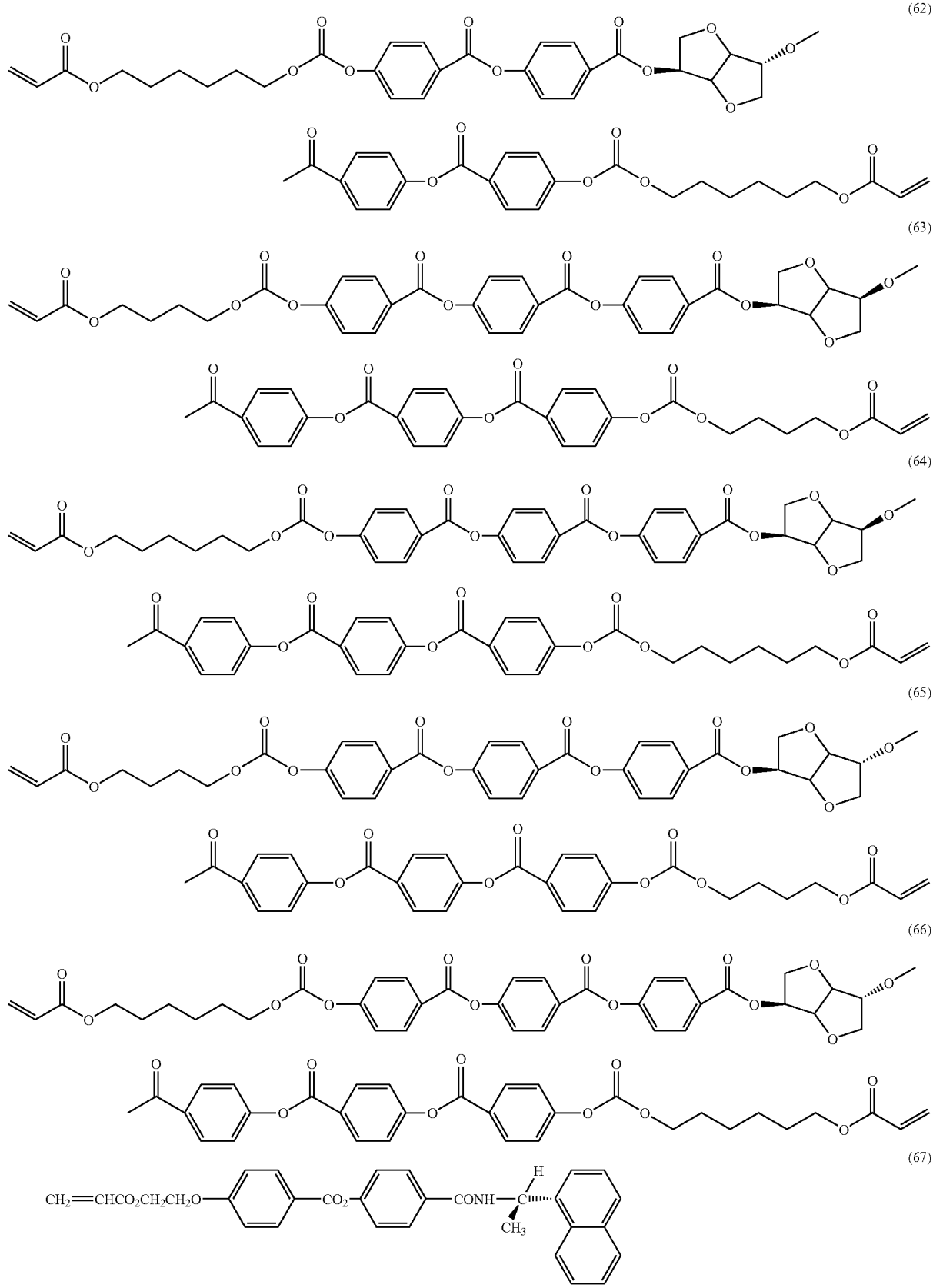

Other than the above-described chiral compounds, chiral compounds mentioned in, for example, DE-A-4342280, German patent applications No. 19520660.6 and No. 19520704.1 can be used preferably.

As the chiral dopant, a polymerizable chiral dopant is used preferably. These chiral dopants may be used alone or in combination of two or more.

In forming a cholesteric layer, the combination of the liquid crystal monomer and the chiral dopant is not particularly limited but specifically can be a combination of the monomer agent of the formula (33) above and the chiral dopant of the formula (61) above, a combination of the monomer agent of the formula (34) above and the chiral dopant of the formula (62) above, or the like.

In these chiral dopants, the helical twisting power thereof preferably is at least $1\times10^{-6}$; $nm^{-1}\cdot(wt\%)^{-1}$, more preferably is at least $1\times10^{-5}$ $nm^{-1}\cdot(wt\%)^{-1}$, further preferably ranges from $1\times10^{-5}$ to $1\times10^{-2}$ $nm^{-1}\cdot(wt\%)^{-1}$, particularly preferably ranges from $1\times10^{-4}$ to $1\times10^{-3}$ $nm^{-1}\cdot(wt\%)^{-1}$. By using the chiral dopant with the above helical twisting power, for example, the helical pitch of the formed cholesteric layer can be controlled to the range described below, making it duly possible to control a selective reflection wavelength range to a particular range.

In general, the helical twisting power refers to an ability to give a twist to a liquid crystal compound such as a liquid crystal monomer, a liquid crystal polymer or the like, thus aligning it in a helical manner, and is represented by the expression below.

Helical twisting power=1/[Cholesteric pitch (nm)× Weight ratio of chiral dopant (wt %)]

In the above expression, the weight ratio of chiral dopant refers to the ratio (weight ratio) of the chiral dopant in a mixture containing, for example, a liquid crystal compound and a chiral dopant, and is represented by the expression below.

Weight ratio of chiral dopant (wt %)=[X/(X+Y)]×100

X: Weight of chiral dopant
Y: Weight of liquid crystal compound

Furthermore, the helical pitch in the cholesteric layer is, for example, preferably in a range of 0.01 μm to 0.25 μm, more preferably in a range of 0.03 μm to 0.20 μm, and still more preferably in a range of 0.05 μm to 0.15 μm. With the helical pitch being not less than 0.01 μm, for example, a sufficient alignment property is obtained. Further, with the helical pitch being not more than 0.25 μm, for example, an optical rotatory power on the short-wavelength side of visible light can be suppressed sufficiently, thereby allowing leakage of light or the like to be prevented sufficiently for use under polarized light as a retardation film for compensation or the like. Also, through the use of a chiral dopant having the above-described helical twisting power, the helical pitch of the formed cholesteric layer can be controlled so as to be in the above-mentioned ranges.

For example, when manufacturing the liquid crystal compound birefringent layer according to the present invention, it is possible to set the selective reflection wavelength range by, for example, controlling the respective addition ratios of the liquid crystal monomer and the chiral dopant. The selective reflection wavelength range can be shifted to the lower wavelength side by, for example, a method in which the chiral dopant is added in an increased amount. However, with the chiral dopant added in an increased amount, the temperature range in which the liquid crystal monomer or the like is aligned in a cholesteric manner, that is, the temperature range in which the liquid crystal monomer is in a liquid crystal phase becomes extremely narrow. Therefore, when manufacturing a liquid crystal compound birefringent layer whose selective reflection wavelength range is lower than 100 nm, the temperature control for allowing the above-mentioned materials as constituents to be aligned in a cholesteric manner has to be carried out precisely, which makes the manufacturing difficult and thus is problematic.

Furthermore, for example, when chiral dopants with equal helical twisting powers are used, the selective reflection wavelength range to be formed is shifted further to the shorter wavelength side with an increase in the addition ratio of the chiral dopant with respect to the liquid crystal monomer. Also, for example, when the addition ratios of the chiral dopants with respect to the liquid crystal monomer are equal, the selective reflection wavelength range of a liquid crystal compound birefringent layer to be formed is shifted further to the shorter wavelength side with an increase in the helical twisting power of the chiral dopants. As a specific example, in the case where the selective reflection wavelength range of the liquid crystal compound birefringent layer to be formed is set to range from 200 nm to 220 nm, it is appropriate that the chiral dopant having a helical twisting power of $5\times10^{-4}$ $nm^{-1}\cdot(wt\%)^{-1}$ be blended to be 11 wt % to 13 wt % with respect to the liquid crystal monomer, for example. In the case where the selective reflection wavelength range is set to range from 290 nm to 310 nm, it is appropriate that the chiral dopant having a helical twisting power of $5\times10^{-4}$ $nm^{-1}\cdot(wt\%)^{-1}$ be blended to be 7 wt % to 9 wt % with respect to the liquid crystal monomer, for example.

The ratio of the chiral dopant to be added is determined suitably according to, for example, a desired helical pitch and a desired selective reflection wavelength range. The addition ratio with respect to the liquid crystal monomer ranges from, for example, 5 wt % to 23 wt % and preferably ranges from 10 wt % to 20 wt %. As described above, by controlling the addition ratio of the chiral dopant to a liquid crystal compound such as a liquid crystal monomer or the like in this manner, the selective wavelength range of a liquid crystal compound birefringent layer to be formed can be set. When the ratio of the chiral dopant to a liquid crystal compound such as a liquid crystal monomer or the like is larger than 5 wt %, it becomes easier to control the selective reflection wavelength range of a liquid crystal compound birefringent layer to be formed to a shorter wavelength side. On the other hand, when this ratio is smaller than 23 wt %, the temperature range in which a liquid crystal compound such as a liquid crystal monomer or the like is aligned in a cholesteric manner, that is, the temperature range in which the liquid crystal compound such as a liquid crystal monomer or the like is in a liquid crystal phase becomes wide, which eliminates the need for precisely controlling the temperature in an aligning process, thereby facilitating the manufacturing.

It is preferable that the liquid crystal compound solution further contains at least one of a polymerizing agent and a crosslinking agent. For example, an ultraviolet curing agent, a photocuring agent or a thermosetting agent can be used.

The polymerizing agent and the crosslinking agent are not particularly limited but can be agents below, for example. As the polymerizing agent, benzoyl peroxide (BPO), azobisisobutyronitrile (AIBN) or the like can be used, for example. As the crosslinking agent, an isocyanate-based crosslinking agent, an epoxy-based crosslinking agent, a metal chelate crosslinking agent or the like can be used, for example. These agents may be used alone or in combination of two or more.

Further, the addition ratio of the crosslinking agent or the polymerizing agent to a liquid crystal compound such as the liquid crystal monomer or the like ranges, for example, from 0.1 wt % to 10 wt %, preferably from 0.5 wt % to 8 wt %, and more preferably from 1 wt % to 5 wt %. When the ratio of the crosslinking agent or the polymerizing agent to a liquid crystal compound such as the liquid crystal monomer or the like is equal to or larger than 0.1 wt %, it becomes sufficiently easy to cure the cholesteric layer, for example. When this ratio is equal to or smaller than 10 wt %, the temperature range in which a liquid crystal compound such as the liquid crystal monomer or the like is aligned in a cholesteric manner, that is, the temperature range in which a liquid crystal compound such as the liquid crystal monomer or the like is in a liquid crystal phase is sufficient, for example, so that the temperature can be controlled still more easily in the aligning process, which will be described later.

The liquid crystal compound solution can be prepared by, for example, dissolving or dispersing the liquid crystal compound or the like in an appropriate solvent. There is no particular limit to the solvent, and for example, solvents described as solvents for the non-liquid crystal polymer solution can be used. Among these solvents, toluene, xylene, mesitylene, MEK, methyl isobutyl ketone, cyclohexanone, ethyl cellosolve, butyl cellosolve, ethyl acetate, butyl acetate, propyl acetate, and ethyl cellosolve acetate are used preferably. For example, these solvents may be used alone or in the form of a mixture of two or more.

Furthermore, for example, various additives may be blended suitably into the liquid crystal compound solution as necessary. Examples of such additives include an antioxidant, a denaturant, a surfactant, a dye, a pigment, a discoloration preventing agent, a UV absorber and the like. These additives may be used alone or in combination of two or more, for example. More specifically, conventionally known materials, for example, phenolic compounds, amine compounds, organic sulfur compounds or phosphinic compounds can be used as the antioxidant, and conventionally known materials, for example, glycols, silicones or alcohols can be used as the denaturant, for example. Furthermore, the surfactant is added, for example, for smoothing the surface of the liquid crystal compound birefringent layer and can be, for example, a silicone surfactant, an acrylic surfactant, a fluorochemical surfactant or the like. In particular, a silicone surfactant is preferable.

It is preferable that the liquid crystal compound solution has a viscosity with an excellent workability in application or the like, for example. The viscosity of the coating solution usually varies depending on the concentration, temperature and the like of the liquid crystal compound. When the concentration of the liquid crystal compound in the coating solution is in the above-noted range of 5 wt % to 70 wt %, the viscosity ranges, for example, from 0.2 to 20 mPa·s, preferably from 0.5 to 15 mPa·s, and particularly preferably from 1 to 10 mPa·s. More specifically, when the concentration of the liquid crystal compound in the coating solution is 30 wt %, the viscosity ranges, for example, from 2 to 5 mPa·s, and preferably from 3 to 4 mPa·s. The coating solution viscosity of equal to or larger than 0.2 mPa·s further prevents the coating solution from flowing undesirably during application, for example, whereas the viscosity of equal to or smaller than 20 mPa·s achieves a still better surface smoothness, further prevents thickness unevenness and allows easy application. Incidentally, although the temperature range from 20° C. to 30° C. has been illustrated for the viscosity described above, there is no particular limitation to this temperature.

The liquid crystal compound solution can be coated on the non-liquid crystal polymer birefringent layer that has been subjected to an aligning treatment by a conventionally known method such as roller coating, spin coating, wire bar coating, dip coating, extrusion method, curtain coating or spray coating. Among these methods, spin coating and extrusion coating are preferable considering the application efficiency.

The liquid crystal compound solution coated on the non-liquid crystal polymer birefringent layer may be hardened arbitrarily. There is no particular limit to the hardening method as long as the method allows the liquid crystal compound solution to be hardened. Examples of the method include air-drying and drying by heating. A condition under which the hardening is carried out also can be determined suitably according to, for example, a type of the liquid crystal compound and a type of the solvent. For example, a temperature at which the hardening is carried out is generally 40° C. to 120° C., preferably 60° C. to 100° C., and more preferably 65° C. to 90° C. The hardening may be carried out at a constant temperature or a temperature raised or lowered in a step-wise manner. A hardening time also is not limited. The hardening time is generally 10 seconds to 60 minutes, and preferably 30 seconds to 30 minutes.

Next, a liquid crystal compound layer thus formed is subjected to an aligning treatment so that the liquid crystal compound is aligned. The aligning treatment can be carried out by a heat treatment or the like.

There is no particular limit to the alignment of the liquid crystal compound, and the alignment should be set suitably so that optimum optical compensation is achieved. For example, horizontal alignment, vertical alignment, twist alignment, hybrid alignment, homeotropic alignment, homogeneous alignment, tilt alignment, focal conic alignment or the like can be employed.

In the case where the liquid crystal compound solution contains the liquid crystal compound and a chiral dopant, the liquid crystal compound that is now in the liquid crystal phase (the liquid crystal state) is aligned while being given a twist by the chiral dopant. In other words, the liquid crystal compound shows a cholesteric structure (a helical structure).

Furthermore, in order to obtain excellent viewing angle compensation, preferably, the liquid crystal compound birefringent layer has an optical axis that is in a direction parallel or perpendicular to a plane, or inclined from the direction perpendicular to the plane. A layer whose optical axis is in a direction parallel to a plane is a so-called C-plate. Particularly, if the layer has a refractive index in an optical axis direction that is larger than that in a direction orthogonal thereto, the layer is a so-called positive C-plate, and if the layer has a refractive index in the optical axis direction that is smaller than that in the direction orthogonal thereto, the layer is a so-called negative C-plate. Further, a layer whose optical axis is in a direction perpendicular to a plane is a so-called A-plate, and a layer whose optical axis is inclined from a direction perpendicular to a plane is a so-called O-plate.

The above-described structures can be expressed in terms of the relationships of refractive indices as follows. That is, the positive C-plate is expressed by $nx=ny<nz$, the negative C-plate is expressed by $nx=ny>nz$, the positive A-plate is expressed by $nx>ny=nz$, and the negative A-plate is expressed by $nx<ny=nz$. In the above description, nx, ny and nz denote refractive indices in the respective directions of X axis, Y axis and Z axis in the liquid crystal compound birefringent layer, respectively. The X axis denotes an axis direction presenting the maximum refractive index within the plane of the liquid crystal compound birefringent layer, the Y axis denotes an axis direction perpendicular to the X axis within the plane, and the Z axis denotes a thickness direction perpendicular to the X axis and the Y axis.

For example, in a liquid crystal cell of a TN type liquid crystal display or an OCB type liquid crystal display, in order to obtain excellent viewing angle compensation, preferably, the optical axis direction is inclined from a direction perpendicular to a plane. Further, in a liquid cell of a VA type liquid crystal display, in order to obtain excellent viewing angle compensation, preferably, the optical axis direction is in a direction horizontal to a plane.

Figure 4:
FIG. 4 is a diagram illustrating the relationship between a liquid crystal and alignment.

Specifically, a discotic liquid crystal constitutes the negative C-plate when in horizontal alignment, the negative A-plate when in vertical alignment, and the negative O-plate when in hybrid alignment. Moreover, a nematic liquid crystal constitutes the positive A-plate when in horizontal alignment, the positive C-plate when in vertical alignment, and the positive O-plate when in hybrid alignment (see FIG. 4). A nematic liquid crystal containing a chiral liquid crystal constitutes the negative C-plate when in horizontal alignment, and the positive or negative O-plate when in hybrid alignment.

The temperature condition in the heat treatment can be determined suitably according to, for example, a type of the liquid crystal compound, more specifically, the temperature at which the liquid crystal compound shows a liquid crystal property. Usually, the temperature ranges from 40° C. to 120° C., preferably from 50° C. to 100° C., and more preferably from 60° C. to 90° C. The temperature equal to or higher than 40° C. usually makes it possible to align the liquid crystal compound sufficiently. For example, with respect to the liquid crystal compound layer using a liquid crystal polymer as the liquid crystal compound, an aligning treatment can be carried out by heating at a temperature ranging from the glass transition point of the liquid crystal polymer to a temperature at which the liquid crystal polymer is in a melted state where it exhibits an isotropic phase.

A heating time can be determined suitably according to, for example, a temperature at which the heat treatment is carried out and a type of the liquid crystal compound. The heating time is, generally 0.5 to 20 minutes, preferably 1 to 15 minutes, and more preferably 2 to 10 minutes.

It is preferable that the aligned liquid crystal compound then is fixed so as to form a liquid crystal compound birefringent layer.

A method of fixing can vary according to a type of a liquid crystal compound, and there is no limit to the method as long as it can fix the alignment state. For example, light irradiation, a treatment with heat, cooling or the like can be employed. An alignment state of the liquid crystal compound layer using a liquid crystal polymer as a liquid crystal compound can be fixed by, for example, cooling. In this case, generally, air-cooling is employed.

Furthermore, an alignment state of the liquid crystal compound layer using a liquid crystal monomer as a liquid crystal compound can be fixed by, for example, light irradiation, a treatment with heat or the like.

The treatment such as the light irradiation or the treatment with heat can be determined suitably according to a type of a polymerizing agent or a crosslinking agent to be used. For example, light irradiation should be carried out in the case of using a photopolymerizing agent or a photo-crosslinking agent, and ultraviolet irradiation should be carried out in the case of using an ultraviolet polymerizing agent or an ultraviolet crosslinking agent. By these treatments, a liquid crystal monomer can be polymerized or cross-linked and fixed.

It is preferable to form a liquid crystal compound birefringent layer by fixing an alignment state in the above-described manner. There is no particular limit to the thickness of a resulting liquid crystal compound birefringent layer. For example, for use as a retardation film for optical compensation, from the viewpoints of the prevention of irregularities in alignment and a transmittance drop, the selective reflection property, the prevention of coloration, the productivity and the like, the thickness is preferably in a range of 0.1 μm to 50 μm, more preferably in a range of 0.5 μm to 30 μm, and most preferably in a range of 1 μm to 20 μm.

Variations of an alignment axis of the liquid crystal compound birefringent layer are, generally not more than ±0.5 degrees, and preferably not more than ±0.3 degrees. Further, an in-plane retardation Re is, generally 0 nm≦Re≦300 nm, and preferably 30 nm≦Re≦150 nm. Further, a retardation Rz in a thickness direction is, generally 40 nm≦Rz≦800 nm, preferably 40 nm≦Rz≦600 nm, and more preferably 40 nm≦Rz≦400 nm.

Furthermore, Re=(nx−ny)·d, and Rz=(nx−nz)·d.

In the above-mentioned expressions, nx, ny and nz denote refractive indices in the respective directions of X axis, Y axis and Z axis in the liquid crystal compound birefringent layer, respectively. The X axis denotes an axial direction presenting the maximum refractive index within the plane of the liquid crystal compound birefringent layer, the Y axis denotes an axial direction perpendicular to the X axis within the plane, and the Z axis denotes a thickness direction perpendicular to the X axis and the Y axis. In the expressions, d denotes the thickness of the liquid crystal compound birefringent layer.

Next, a polarizing plate according to the present invention is a polarizing plate with an optical compensation layer including a birefringent film, in which the birefringent film is the birefringent film according to the present invention.

There is no particular limit to the configuration of the polarizing plate with an optical compensation layer described above as long as the plate has a birefringent film according to the present invention and a polarizer. The birefringent film may be, for example, a birefringent film obtained by the manufacturing method according to the present invention or a laminated body of the birefringent film and the base. Examples of the plate include polarizing plates below.

First, a first embodiment of the polarizing plate with an optical compensation layer has, for example, the birefringent film according to the present invention, a polarizer, and two transparent protective layers. In this embodiment, the transparent protective layers are laminated respectively on both surfaces of the polarizer, and the birefringent film further is laminated on a surface of one of the transparent protective layers.

Furthermore, the transparent protective layers may be laminated respectively on both sides or only on one surface of the polarizer. Further, in the case where the transparent protective layers are laminated respectively on both surfaces, for example, the transparent protective layers may be of the same type or of different types.

Meanwhile, a second embodiment of the polarizing plate with an optical compensation layer has a laminated body of the birefringent film according to the present invention and a base, a polarizer, and a transparent protective layer. In this embodiment, the birefringent film is laminated on one surface of the polarizer, and the transparent protective layer is laminated on the other surface of the polarizer. In this case, it is preferable that the base is formed of a transparent base.

Either surface of the laminated body of the birefringent film and the base may face the polarizer. Based on the following reason, for example, preferably, the laminated body is arranged so that the side of the base in the laminated body faces the polarizer. The reason is that this configuration allows the base for the birefringent film to be used also as the transparent protective layer in the polarizing plate. That is, instead of laminating transparent protective layers respectively on both surfaces of the polarizer, the transparent protective layer is laminated on one surface of the polarizer, and the birefringent film is laminated so that the base faces the other surface of the polarizer, which allows the base to function also as a transparent protective layer. Thus, a polarizing plate having a further reduced thickness can be obtained.

Meanwhile, a third embodiment of the polarizing plate with an optical compensation layer has a laminated body of the birefringent film according to the present invention and a polarizer as a base, and a transparent protective layer. In this embodiment, the transparent protective layer is laminated on a surface of the polarizer of the laminated body, respectively.

The laminated body of the birefringent film and the polarizer as the base is preferable because the birefringent film can be used also as a protective layer for the polarizer. That is, instead of laminating transparent protective layers respectively on both surfaces of the polarizer, the transparent protective layer is laminated on one surface of the polarizer, and the birefringent film is laminated on the other surface of the polarizer, which allows the birefringent film to function also as a protective layer. Thus, a polarizing plate having a further reduced thickness can be obtained.

The polarizer (polarizing film) is not particularly limited but can be a film prepared by a conventionally known method of, for example, dyeing by allowing a film of various types to adsorb a dichroic material such as iodine or a dichroic dye, followed by crosslinking, stretching and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as polyvinyl alcohol (PVA)-based films, partially-formalized PVA-based films, partially-saponified films based on an ethylene-vinyl acetate copolymer and cellulose-based films. Other than the above, polyene alignment films such as dehydrated PVA and dehydrocblorinated polyvinyl chloride can be used, for example. Among them, the PVA-based film is preferable. Further, generally, the polarizing film has a thickness in a range of 1 to 80 μm with no limitation thereto.

The protective layer is not particularly limited but can be a conventionally known transparent film. For example, transparent protective films having excellent transparency, mechanical strength, thermal stability, a moisture shielding property and isotropism are preferable. Specific examples of materials for such a transparent protective layer can include cellulose-based resins such as triacetylcellulose, and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in light of the polarization property and durability.

Moreover, the polymer film described in JP 2001-343529 A (WO 01/37007) also can be used. The polymer material used can be a resin composition containing a thermoplastic resin whose side chain has a substituted or unsubstituted imido group and a thermoplastic resin whose side chain has a substituted or unsubstituted phenyl group and nitrile group, for example, a resin composition containing an alternating copolymer of isobutene and N-methyl maleimide and an styrene-acrylonitrile copolymer. Alternatively, for example, the polymer film may be formed by extruding the resin composition.

It is preferable that the protective layer is colorless, for example. More specifically, a retardation value (Re) of the film in its thickness direction as represented by the expression below preferably ranges from −90 nm to +75 nm, more preferably ranges from −80 nm to +60 nm, and particularly preferably ranges from −70 nm to +45 nm. When the retardation value is within the range of −90 nm to +75 nm, coloration (optical coloration) of the polarizing plate, which is caused by the protective film, can be solved sufficiently. In the expression below, nx, ny and nz are the same as described above, and d denotes a thickness of the protective layer.

$$Re=[\{(nx+ny)/2\}-nz]\cdot d$$

The transparent protective layer further may have an optically compensating function. As such a transparent protective layer having the optically compensating function, it is possible to use, for example, a known layer used for preventing coloration or for widening a preferable viewing angle caused by changes in a visible angle based on retardation in a liquid crystal cell. Specific examples include various films obtained by stretching the above-described transparent resins uniaxially or biaxially, an alignment film of a liquid crystal polymer or the like, and a laminated body obtained by providing an alignment layer of a liquid crystal polymer on a transparent base. Among the above, the alignment film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-alignment layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the retardation film and the film support of a triacetylcellulose film or the like so as to control the optical characteristics such as retardation.

The thickness of the transparent protective layer is not particularly limited but can be determined suitably according to retardation or a protective strength, for example. In general, the thickness of the transparent protective layer is in the range not greater than 500 μm, preferably from 5 μm to 300 μm, and more preferably from 5 μm to 150 μm.

The transparent protective layer can be formed suitably by a conventionally known method such as a method of applying a polarizing film with the above-mentioned various transparent resins or a method of laminating the transparent resin film, the optically compensating retardation plate or the like on the polarizing film, or can be a commercially available product.

The transparent protective layer further may be subjected to, for example, a hard coating treatment, an antireflection treatment, treatments for anti-sticking, diffusion and anti-glaring and the like. The hard coating treatment aims to prevent scratches on the surfaces of the polarizing plate, and is a treatment of, for example, providing a curing coating film that is formed of a curable resin and has excellent hardness and smoothness onto a surface of the transparent protective layer. The curable resin can be, for example, ultraviolet-curing resins based on silicone, urethane, acrylic substances, epoxy and the like. The treatment can be carried out by a conventionally known method. The anti-sticking treatment aims at preventing adjacent layers from sticking to each other. The antireflection treatment aims to prevent reflection of external light on the surface of the polarizing plate, and can be carried out by forming a conventionally known antireflection layer or the like.

The anti-glare treatment aims at preventing reflection of external light on the polarizing plate surface from hindering visibility of light transmitted through the polarizing plate. The anti-glare treatment can be carried out, for example, by providing microscopic asperities on a surface of the transparent protective layer by a conventionally known method. Such microscopic asperities can be provided, for example, by roughening the surface by sand-blasting, embossing or the like, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 μm to 20 μm, though there is no particular limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no particular limitation.

An anti-glare layer in which the transparent fine particles are blended can be used as the transparent protective layer itself or provided as a coated layer applied onto the transparent protective layer surface. Furthermore, the anti-glare layer also can function as a diffusion layer to diffuse light transmitted through the polarizing plate in order to widen the viewing angle (i.e., visually-compensating function and the like).

The antireflection layer, the anti-sticking layer, the diffusion layer, the anti-glare layer mentioned above and the like can be laminated on the polarizing plate, for example, as a sheet of optical layers comprising these layers, separately from the transparent protective layer.

There is no particular limit to the method of laminating the constituent members (the birefringent film, the polarizer, the transparent protective layer and the like), and conventionally known methods can be employed. Generally, a sticking agent, an adhesive or the like that is the same as described above can be used and determined suitably according to a material or the like of each of the constituent members. The adhesive can be, for example, a polymer adhesive based on acrylic substances, vinyl alcohol, silicone, polyester, polyurethane or polyether, or a rubber-based adhesive. It also is possible to use an adhesive containing a water-soluble cross-linking agent of vinyl alcohol-based polymers such as boric acid, borax, glutaraldehyde, melamine and oxalic acid. The sticking agent and the adhesive mentioned above do not peel off easily even when being exposed to moisture or heat, for example, and have excellent light transmittance and polarization degree. More specifically, these sticking agent and adhesive preferably are PVA-based adhesives when the polarizer is a PVA-based film, in light of stability of adhering treatment, for example. These adhesive and sticking agent may be applied directly to surfaces of the polarizer and the transparent protective layer, or a layer of a tape or a sheet formed of the adhesive or sticking agent may be arranged on the surfaces thereof. Further, when these adhesive and sticking agent are prepared as an aqueous solution, for example, other additives or a catalyst such as an acid catalyst may be blended as necessary. In the case of applying the adhesive, for example, other additives or a catalyst such as an acid catalyst further may be blended in the aqueous solution of the adhesive. The thickness of the adhesive layer is not particularly limited but may be, for example, 1 nm to 500 nm, preferably 10 nm to 300 nm, and more preferably 20 nm to 100 nm. It is possible to adopt a conventionally known method of using an adhesive etc. such as an acrylic polymer or a vinyl alcohol-based polymer without any particular limitations. These adhesives can be used, for example, by applying its aqueous solution to the surface of each constituent member mentioned above, followed by drying. In the above aqueous solution, other additives or a catalyst such as an acid catalyst may be blended as necessary. Among these, the adhesive preferably is a PVA-based adhesive because an excellent adhesiveness to a PVA film can be achieved.

In a VA type liquid crystal display, when the lamination is carried out so that the transmission axis of a polarizing plate and the slow axis direction of a birefringent film are in a positional relationship such that they are parallel or orthogonal to each other, the contrast characteristics in the oblique direction can be controlled without affecting the contrast characteristics in the front direction. This allows a viewing angle to be widened and thus is preferable.

The polarizing plate with an optical compensation layer according to the present invention can include in use an additional optical layer together with the birefringent film of the present invention. Examples of the optical layers include various optical layers that have been conventionally known and used for forming liquid crystal displays or the like, such as a polarizing plate, a reflector, a semitransparent reflector, and a brightness-enhancement film, another retardation plate, a diffusion controlling film, a polarizing and scattering film and the like as mentioned below. These optical layers can be used alone or in combination of at least two types of layers. Such an optical layer can be provided as a single layer, or at least two optical layers can be laminated. A polarizing plate with an optical compensation layer, which further includes such an optical layer, is used preferably as, for example, an integrated polarizing plate having an optically compensating function, and it can be arranged on a surface of a liquid crystal cell, for example, so as to be used suitably for various image displays.

The integrated polarizing plate will be described below.

First, an example of a reflective polarizing plate or a semitransparent reflective polarizing plate will be described. The reflective polarizing plate is prepared by further laminating a reflector on a polarizing plate with an optical compensation layer according to the present invention, and the semitransparent reflective polarizing plate is prepared by further laminating a semitransparent reflector on a polarizing plate with an optical compensation layer according to the present invention.

In general, such a reflective polarizing plate is arranged on a backside of a liquid crystal cell in order to make a liquid crystal display (reflective liquid crystal display) to reflect incident light from a visible side (display side). The reflective polarizing plate has some merits, for example, assembling of light sources such as backlight can be omitted, and the liquid crystal display can be thinned further.

The reflective polarizing plate can be formed in any conventionally known manner such as forming a reflector of metal or the like on one surface of a polarizing plate having the elastic modulus. More specifically, one example thereof is a reflective polarizing plate formed by matting one surface (surface to be exposed) of a transparent protective layer of the polarizing plate as required, and providing the surface with a deposited film or a metal foil comprising a reflective metal such as aluminum as a reflector.

An additional example of a reflective polarizing plate is prepared by forming, on a transparent protective layer having a surface with microscopic asperities due to microparticles contained in various transparent resins, a reflector corresponding to the microscopic asperities. The reflector having a microscopic asperity surface has advantages of, for example, diffusing incident light irregularly so that directivity and glare can be prevented and irregularity in color tones can be controlled. The reflector can be formed by attaching the metal foil or the metal deposited film directly on an asperity surface of the transparent protective layer in any conventionally known methods including deposition such as vacuum deposition, and plating such as ion plating and sputtering.

As mentioned above, the reflector can be formed directly on a transparent protective layer of a polarizing plate. Alternatively, the reflector can be used as a reflecting sheet formed by providing a reflecting layer onto a proper film similar to the transparent protective film. Since a typical reflecting layer of a reflector is made of a metal, it is preferably used in a state that the reflecting surface is coated with the film, a polarizing plate or the like in order to prevent a reduction of the reflection rate due to oxidation, furthermore, to maintain the initial reflection rate for a long period, and to avoid a separate formation of a transparent protective layer.

The semitransparent polarizing plate is provided by replacing the reflector in the above-mentioned reflective polarizing plate by a semitransparent reflector, and it is exemplified by a half mirror that reflects and transmits light at the reflecting layer.

In general, such a semitransparent polarizing plate is arranged on a backside of a liquid crystal cell. In a liquid crystal display including the semitransparent polarizing plate, incident light from the visible side (display side) is reflected to display an image when the liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used effectively to form a liquid crystal display that can save energy for a light source such as a backlight under a bright atmosphere, while the built-in light source can be used under a relatively dark atmosphere.

The following description is about an example of a polarizing plate prepared by further laminating a brightness-enhancement film on a polarizing plate with an optical compensation layer according to the present invention.

A suitable example of the brightness-enhancement film is not particularly limited, but it can be selected from a multilayer thin film of a dielectric or a multilayer laminated body of thin films with varied refractive index anisotropy that transmits linearly polarized light having a predetermined polarization axis while reflecting other light. As such a brightness-enhancement film, for example, trade name: "D-BEF" manufactured by 3M Co. can be used. Further, a cholesteric liquid crystal layer, more specifically, an alignment film of a cholesteric liquid crystal polymer, the aligned liquid crystal layer fixed onto a supportive film substrate or the like can be used, which reflects either clockwise or counterclockwise circularly polarized light while transmitting other light. Examples thereof include trade name: "PCF 350" manufactured by Nitto Denko Corporation and trade name: Transmax" manufactured by Merck and Co., Inc.

Furthermore, as a retardation plate used together with a birefringent film, as well as a quarter wavelength plate, an uniaxially or biaxially stretched polymer film, a polymer film that has been subjected to a z-axis aligning treatment, a liquid crystal polymer layer or the like, which has a proper retardation, can be used. A diffusion controlling film is to control glaring, scattering light and the like that relate to a viewing angle and a resolution and may be an optically functional film utilizing diffusion, scattering and/or refraction. A polarizing and scattering film is a film containing a scattering material so that polarized light causes scattering anisotropy due to its oscillation direction, and can be used to control polarized light.

An example of the various polarizing plates of the present invention can be an optical member including two or more optical layers, which is formed by laminating an additional optical layer and the above-mentioned laminated polarizing plate including a birefringent layer.

An optical member comprising a laminate of at least two optical layers can be formed, for example, by a method of laminating layers separately in a certain order for manufacturing a liquid crystal display or the like. However, since an optical member that has been laminated previously has excellent stability in quality and assembling operability, efficiency in manufacturing a liquid crystal display can be improved. In the same manner as described above, any appropriate adhesives such as a pressure-sensitive adhesive layer can be used for lamination.

It is preferable that the various polarizing plates described above further have a pressure-sensitive adhesive layer or an adhesive layer so as to allow easier lamination onto the other members such as a liquid crystal cell. These adhesive layers can be arranged on one surface or both surfaces of the polarizing plate. The material of the pressure-sensitive adhesive layer is not particularly limited but can be a conventionally known material such as acrylic polymers. Further, a pressure-sensitive adhesive layer having a low moisture absorption coefficient and an excellent thermal resistance, for example, is preferable from the aspects of prevention of foaming or peeling caused by moisture absorption, prevention of degradation in the optical characteristics and warping of a liquid crystal cell caused by difference in thermal expansion coefficients and formation of an image display with high quality and excellent durability. It also may be possible to incorporate fine particles so as to form the pressure-sensitive adhesive layer showing light diffusion property. For the purpose of forming the pressure-sensitive adhesive layer on the surface of the polarizing plate, a solution or melt of a sticking material can be applied directly on a predetermined surface of the polarizing plate by flow-expansion, coating or the like. Alternatively, a pressure-sensitive adhesive layer can be formed on a separator, which will be described below, in the same manner and transferred to a predetermined surface of the polarizing plate. Such a layer can be formed on any surface of the polarizing plate. For example, it can be formed on an exposed surface of the retardation plate of the polarizing plate.

When a surface of a layer of a pressure-sensitive adhesive provided on the polarizing plate is exposed, preferably, the pressure-sensitive adhesive layer is covered with a separator until the time the pressure-sensitive adhesive layer is used so that contamination will be prevented. The separator can be formed by coating, on a proper film such as the transparent protective film, a peeling layer including a peeling agent containing silicone, long-chain alkyl, fluorine, molybdenum sulfide or the like as required.

The pressure-sensitive adhesive layer or the like can be a monolayer or a laminated body. The laminated body can be, for example, a combination of monolayers different from each other in the type or in the compositions. Pressure-sensitive adhesive layers arranged on both surfaces of the polarizing plate can be the same or different from each other in the type or in the compositions.

The thickness of the pressure-sensitive adhesive layer can be determined appropriately depending on the constituents or the like of the polarizing plate. In general, the thickness of the pressure-sensitive adhesive layer is 1 µm to 500 µm.

It is preferable that the pressure-sensitive adhesive layer is made of a pressure-sensitive adhesive having excellent optical transparency and sticking characteristics such as moderate wettability, cohesiveness, and adhesiveness. For specific example, the pressure-sensitive adhesive can be prepared appropriately based on polymers such as an acrylic polymer, a silicone-based polymer, polyester, polyurethane, polyether, and synthetic rubber.

Sticking characteristics of the pressure-sensitive adhesive layer can be controlled appropriately by a conventionally known method. For example, the degree of cross-linkage and the molecular weight will be adjusted on the basis of a composition or molecular weight of the base polymer of the pressure-sensitive adhesive layer, crosslinking type, a content of the crosslinking functional group, an amount of the blended crosslinking agent and the like.

The respective layers such as a polarizing film, a transparent protective layer, an optical layer and a pressure-sensitive adhesive layer for composing various optical members (various polarizing plates having additional laminates of optical layers) and the above-described birefringent film and polarizing plate according to the present invention can have ultraviolet absorption power as a result of an appropriate treatment with an ultraviolet absorber such as, for example, a salicylate compound, a benzophenone compound, a benzotriazole compound, a cyanoacrylate compound, and a nickel complex salt compound.

As mentioned above, the birefringent film and the polarizing plate according to the present invention can be used preferably for forming various devices such as liquid crystal displays. For example, a polarizing plate is arranged on at least one surface of a liquid crystal cell in order to form a liquid crystal panel used in a liquid crystal display of, e.g., a reflection type, a semitransparent type, or a transmission-reflection type.

A liquid crystal cell to compose the liquid crystal display can be selected from appropriate cells such as an active matrix driving type represented by a thin film transistor, a simple matrix driving type represented by a twist nematic type and a super twist nematic type. Since the birefringent film and the polarizing plate according to the present invention are excellent particularly in optical compensation of a VA (Vertical Aligned) cell, they are used particularly preferably for viewing-angle compensating films for VA mode liquid crystal displays.

In general, a typical liquid crystal cell is composed of opposing liquid crystal cell substrates and a liquid crystal injected into a space between the substrates. The liquid crystal cell substrates can be made of glass, plastics or the like without any particular limitations. Materials for the plastic substrates can be selected from conventionally known materials without any particular limitations.

When polarizing plates or optical members are arranged on both surfaces of a liquid crystal cell, the polarizing plates or the optical members on the surfaces can be the same type or different types. Moreover, for forming a liquid crystal display, one or more layers of appropriate components such as, for example, a prism array sheet, a lens array sheet, an optical diffuser and a backlight can be arranged at proper positions.

The liquid crystal display according to the present invention is not particularly limited as long as it includes a liquid crystal panel and uses a liquid crystal panel according to the present invention as the liquid crystal panel. When it includes further a light source, preferably, the light source is a flat light source emitting polarized light for enabling effective use of light energy, though there is no particular limitation.

An example of the liquid crystal panel according to the present invention has the following configuration. For example, the liquid crystal panel as the example has a structure including a liquid crystal cell, the birefringent film according to the present invention, a polarizer, and a transparent protective layer, in which the birefringent film is laminated on one surface of the liquid crystal cell, and the polarizer and the transparent protective layer are laminated in this order on the other surface of the birefringent film. The liquid crystal cell has a configuration in which a liquid crystal is held between two liquid crystal cell substrates. Further, in the case where the birefringent film is a laminated body of a birefringent layer and a base as described above, although there is no particular limit to the arrangement of the respective layers, for example, in a possible embodiment, the laminated body faces the liquid crystal cell on its birefringent layer side and faces the polarizer on its base side.

The liquid crystal display according to the present invention can include additional member(s) on the birefringent film (polarizing plate) on the visible side. The member can be at least one of optical layers selected from, for example, a diffusion plate, an anti-glare layer, an antireflection film, a protective layer, a protective plate, a reflector, a semitransparent reflector, a brightness-enhancement film, a diffusion controlling film, a polarizing and scattering film and the like. Alternatively, a compensating retardation plate or the like can be arranged suitably between the liquid crystal cell and the polarizing plate in the liquid crystal panel.

The birefringent film and the polarizing plate according to the present invention can be used not only in the above-described liquid crystal display but also in, for example, self-light-emitting displays such as an organic electroluminescence (EL) display, a plasma display (PD) and a field emission display (FED). When used in a self-light-emitting flat display, the birefringent film according to the present invention is set so as to have an in-plane retardation value Re of λ/4, for example, and thus circularly polarized light can be obtained. This allows the birefringent film to be used as an antireflection filter.

The following is a specific description of an electroluminescence (EL) display comprising the polarizing plate according to the present invention. The EL display of the present invention is a display having the birefringent film or the polarizing plate according to the present invention, and can be either an organic EL display or an inorganic EL display.

In recent EL displays, for preventing reflection from an electrode in a black state in an EL display, for example, use of a birefringent film such as a polarizer and a polarizing plate as well as a λ/4 plate is proposed. The polarizer and the birefringent film according to the present invention are especially useful when linearly polarized light, circularly polarized light or elliptically polarized light is emitted from an EL layer. They are also especially useful when an obliquely emitted light is partially polarized even in the case where natural light is emitted in a front direction.

First, a typical organic EL display will be explained below. In general, such an organic EL display has a luminant (organic EL luminant) that is prepared by laminating a transparent electrode, an organic luminant layer and a metal electrode in this order on a transparent substrate. Here, the organic ruminant layer is a laminated body of various organic thin films. Examples thereof include various combinations such as a laminated body of a hole injection layer made of a triphenylamine derivative or the like and a ruminant layer made of a phosphorous organic solid such as anthracene; a laminated body of the luminant layer and an electron injection layer made of a perylene derivative or the like; and a laminated body of the hole injection layer, the luminant layer and the electron injection layer.

In general, the organic EL display emits light on the following principle: a voltage is applied to the anode and the cathode so as to inject holes and electrons into the organic ruminant layer, energy generated by the re-bonding of these holes and electrons excites the phosphor, and the excited phosphor emits light when it returns to the basis state. The mechanism of the re-bonding of these holes and electrons during the process is similar to that of an ordinary diode. This implies that current and the light emitting intensity exhibit a considerable nonlinearity accompanied with a rectification with respect to the applied voltage.

It is preferred for the organic EL display that at least one of the electrodes is transparent so as to obtain luminescence at the organic ruminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag and Al—Li can be used.

In an organic EL display configured as described above, it is preferable that the organic ruminant layer is made of a film that is extremely thin such as about 10 nm, for example, so that the organic ruminant layer can transmit substantially whole light as the transparent electrode does. As a result, when the layer does not illuminate, a light beam entering from the surface of the transparent substrate and passing through the transparent electrode and the organic luminant layer before being reflected at the metal electrode comes out again to the surface of the transparent substrate. Thereby, the display surface of the organic EL display looks like a mirror when viewed from exterior.

An organic EL display according to the present invention, which includes the organic EL ruminant, has, for example, a transparent electrode on the surface side of the organic luminant layer, and a metal electrode on the backside of the organic luminant layer. In the organic El display, it is preferable that the birefringent film (polarizing plate or the like) according to the present invention is arranged on the surface of the transparent electrode, and furthermore, a λ/4 plate is arranged between the polarizing plate and an EL element. As described above, an organic EL display obtained by arranging the birefringent film according to the present invention can suppress external reflection and improve the visibility. It is further preferable that a retardation plate is arranged between the transparent electrode and the birefringent film.

The retardation plate and the birefringent film (polarizing plate or the like) polarize, for example, light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be π/4. That is, the polarizing plate transmits only the linearly polarized light component among the external light entering the organic EL display. In general, the linearly polarized light is changed into elliptically polarized light by the retardation plate. Particularly, when the retardation plate is a quarter wavelength plate and when the angle is π/4, the light is changed into circularly polarized light.

This circularly polarized light passes through, for example, the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. Consequently, as described above, the mirror of the metal electrode can be blocked completely.

EXAMPLES

Hereinafter, the present invention will be described more specifically by way of examples and comparative examples. However, the present invention is not limited to the following examples. Further, the characteristics of a birefringent film were evaluated by the following methods.

(Measurement of Retardation)

The measurement was carried out using KOBRA21ADH, trade name (manufactured by Oji Scientific Instruments).

(Measurement of Axis Accuracy)

The measurement was carried out using KOBRA21ADH, trade name (manufactured by Oji Scientific Instruments).

With respect to each of layers, Re and Rz were determined by the following expressions.

$$\text{Re (retardation value in an in-plane direction)} = (nx - ny) \cdot d.$$

$$\text{Rz (retardation value in a thickness direction)} = (nx - nz) \cdot d$$

In the above-mentioned expressions, nx, ny, and nz denote refractive indices in the directions of an X axis, Y axis and Z axis in each of the layers, respectively. The X axis is an axis direction presenting a maximum refractive index within the plane of each of the layers, the Y axis is an axis direction perpendicular to the X axis within the plane, and the Z axis denotes a thickness direction perpendicular to the X axis and the Y axis. Further, d denotes the thickness of each of the layers.

Example 1

Polyimide having a weight-average molecular weight (Mw) of 120,000 was synthesized from 2,2'-bis(3,4-dicarboxyphenyl)hexafluoropropane and 2,2'-bis(trifluoromethyl)-4,4'-diaminobiphenyl and dissolved in cyclohexanone, and thus a 15 wt % polyimide solution was prepared. Then, the polyimide solution was coated on a triacetylcellulose (TAC) film having a thickness of 50 μm. After that, a resulting coated film was dried at a temperature of 100° C. for 10 minutes, and thus a polyimide film having a thickness of 6 μm was formed. The polyimide film had a Re of 0.04 nm and a Rz of 240 nm.

A laminated body of the polyimide film and the TAC film was subjected to longitudinal uniaxial stretching at a temperature of 160° C. at a stretch ratio of 10% with respect to the length of the laminated body before being stretched. The polyimide film of the laminated body thus stretched was a birefringent layer that exhibited characteristics expressed by nx>ny>nz and had a Re of 140 nm and a Rz of 250 nm.

A rod-like nematic liquid crystal monomer represented by chemical formula (68) below (90 parts by weight), a photo-polymerization initiator (trade name: IRGACURE 907: manufactured by Ciba Specialty Chemicals) (5 parts by weight), and methyl ethyl ketone (300 parts by weight) were mixed, and a resulting mixture was coated on the birefringent layer in a thickness of about 1.1 μm. Then, a heat treatment was carried out with respect thereto at a temperature of 90° C. for one minute so that the liquid crystal monomer was aligned. After that, ultraviolet irradiation was carried out so that the monomer was polymerized and fixed. A resulting layer of the liquid crystal compound was a birefringent layer that had a thickness of about 0.8 μm, a Re of 100 nm, and the characteristics expressed by nx>ny=nz (positive A-plate). A birefringent film including the non-liquid crystal polymer birefringent layer having the characteristics expressed by nx>ny>nz and the liquid crystal compound birefringent layer was obtained. The optical characteristics of the birefringent film thus obtained are shown in Table 1 below.

A laminated body of the polyimide film and the TAC film was subjected to transverse uniaxial stretching (tenter) at a temperature of 160° C. at a stretch ratio of 15% with respect to the length of the laminated body before being stretched. The polyimide film of the laminated body thus stretched was a birefringent layer that exhibited characteristics expressed by nx>ny>nz and had a Re of 130 nm and a Rz of 260 nm.

In the same manner as in Example 1, a birefringent layer that had a thickness of about 0.8 μm, a Re of 100 nm, and characteristics expressed by nx>ny=nz was formed on the birefringent layer. A birefringent film including a non-liquid crystal polymer birefringent layer exhibiting the characteristics expressed by nx>ny>nz and a liquid crystal compound birefringent layer was obtained. The optical characteristics of the birefringent film thus obtained are shown in Table 1 below.

Example 4

The polyimide solution prepared in Example 1 was coated on a TAC film having a thickness of 50 μm. Then, a resulting coated film was dried at a temperature of 100° C. for 10 minutes, and thus a polyimide film having a thickness of 6 μm was formed. The polyimide film had a Re of 0.04 nm and a Rz of 240 nm.

The polyimide film was subjected to rubbing using a rubbing cloth.

In the same manner as in Example 1, a birefringent layer that had a thickness of about 0.8 μm, a Re of 100 nm, and characteristics expressed by nx>ny=nz was formed on the birefringent layer. A birefringent film including a non-liquid

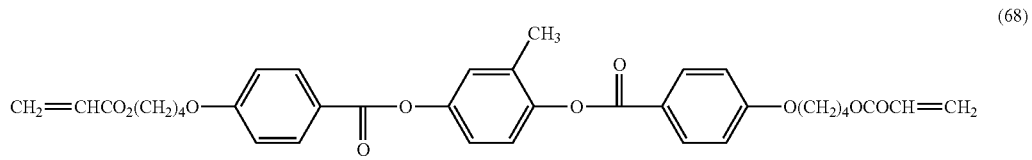

(68)

Example 2

In the same manner as in Example 1 except that a 0.5-μm-thick polyimide film in which an amount of a remaining solvent was 1 wt % was formed, a birefringent film including a non-liquid crystal polymer birefringent layer exhibiting characteristics expressed by nx>ny>nz and a liquid crystal compound birefringent layer was obtained. The optical characteristics of the birefringent film thus obtained are shown in Table 1 below.

Example 3

Polyimide having a weight-average molecular weight (Mw) of 30,000 was synthesized from 4,4'-bis(3,4-dicarboxyphenyl)-2,2-diphenylpropane dianhydride and 2,2'-dichloro-4,4'-diaminobiphenyl and dissolved in cyclopentanone, and thus a 20 wt % polyimide solution was prepared. Then, the polyimide solution was coated on a TAC film having a thickness of 80 μm. After that, a resulting coated film was subjected to a treatment with heat at a temperature of 130° C. for 5 minutes, and thus a transparent and smooth polyimide film having a thickness of 7 μm was formed. The polyimide film had a Re of 0.05 nm and a Rz of 175 nm.

crystal polymer birefringent layer exhibiting characteristics expressed by nx>ny>nz and a liquid crystal compound birefringent layer was obtained. The optical characteristics of the birefringent film thus obtained are shown in Table 1 below.

Comparative Example 1

A polymer whose side chain had cyanobenzene was dissolved in cyclohexanone, and thus a 1 wt % polymer solution was prepared. Then, the polymer solution was coated on a TAC film having a thickness of 50 μm. After that, a resulting coated film was irradiated with polarized visible light at an intensity of 800 mJ/cm$^2$, and thus an alignment film was formed.

In the same manner as in Example 1, a birefringent layer that had a thickness of about 0.8 μm, a Re of 100 nm, and characteristics expressed by nx>ny=nz was formed on the alignment film. A birefringent film including an alignment film layer according to the conventional technique and a liquid crystal compound birefringent layer was obtained. The optical characteristics of the birefringent film thus obtained are shown in Table 1 below.

TABLE 1

| | Non-liquid crystalline polymer birefringent layer or alignment film | | | | | Liquid crystal compound birefringent layer | | | |
|---|---|---|---|---|---|---|---|---|---|
| | Thickness (μm) | Re (nm) | Rz (nm) | Refractive index relationship | Axis accuracy (degree) | Thickness (μm) | Re (nm) | Refractive index relationship | Axis accuracy (degree) |
| Ex. 1 | 5.8 | 140 | 250 | nx > ny > nz | ±0.3 | 0.8 | 100 | nx > ny = nz | ±0.3 |
| Ex. 2 | 0.5 | 15 | 24 | nx > ny > nz | ±0.3 | 0.8 | 100 | nx > ny = nz | ±0.3 |
| Ex. 3 | 6.8 | 130 | 260 | nx > ny > nz | ±0.3 | 0.8 | 100 | nx > ny = nz | ±0.3 |
| Ex. 4 | 6 | 0.04 | 240 | nx = ny > nz | — | 0.8 | 100 | nx > ny = nz | ±0.2 |
| Com. Ex. 1 | 0.2 | ≈0 | ≈0 | — | — | 0.8 | 100 | nx > ny = nz | ±0.3 |

(Evaluation Test)

Each of the birefringent films obtained in Examples 1 to 4 and the birefringent film obtained in Comparative Example 1 was laminated on a polarizing plate (manufactured by Nitto Denko Corporation, trade name: SEG1425DU) through an acrylic pressure-sensitive adhesive layer so that its slow axis is orthogonal to an absorption axis of the polarizing plate. A resulting laminated body was bonded to each side of a vertically aligned mode liquid crystal cell through an acrylic pressure-sensitive adhesive layer so that polarization axes of the polarizing plates on both sides are orthogonal to each other, and thus a liquid crystal panel was formed.

Next, for the thus obtained liquid crystal panel, viewing angles at contrast ratios of (Co)≧10 in a perpendicular direction, in a lateral direction, in a diagonal direction (45° to 225°), and in a diagonal direction (135° to 315°), were measured. The contrast ratios were obtained by, displaying a white image and a black image on the liquid crystal panel, for measuring the values of Y, x and y in a XYZ display system at viewing angles of 0-70° at the front, upper, lower, right and left sides of the display, by using Ez contrast 160D (manufactured by ELDIM SA.). Based on the Y-value ($Y_W$) for the white image and the Y-value ($Y_B$) for the black image, the contrast ratio ($Y_W/Y_B$) for every viewing angle was calculated.

Figure 2:
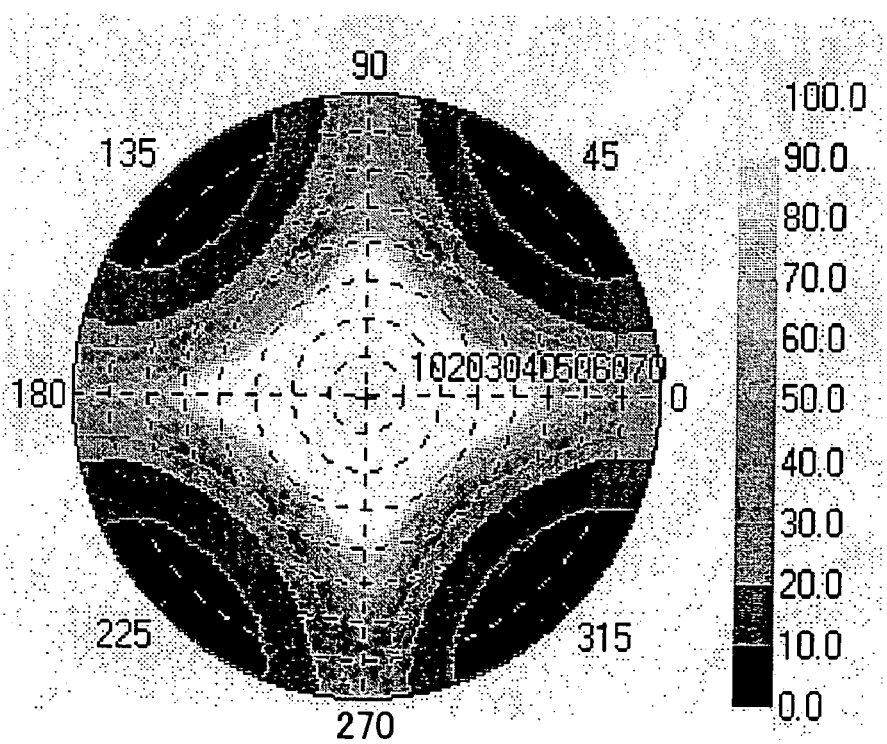
FIG. 2 shows a contrast curve of a liquid crystal panel of Example 2.
Figure 3:
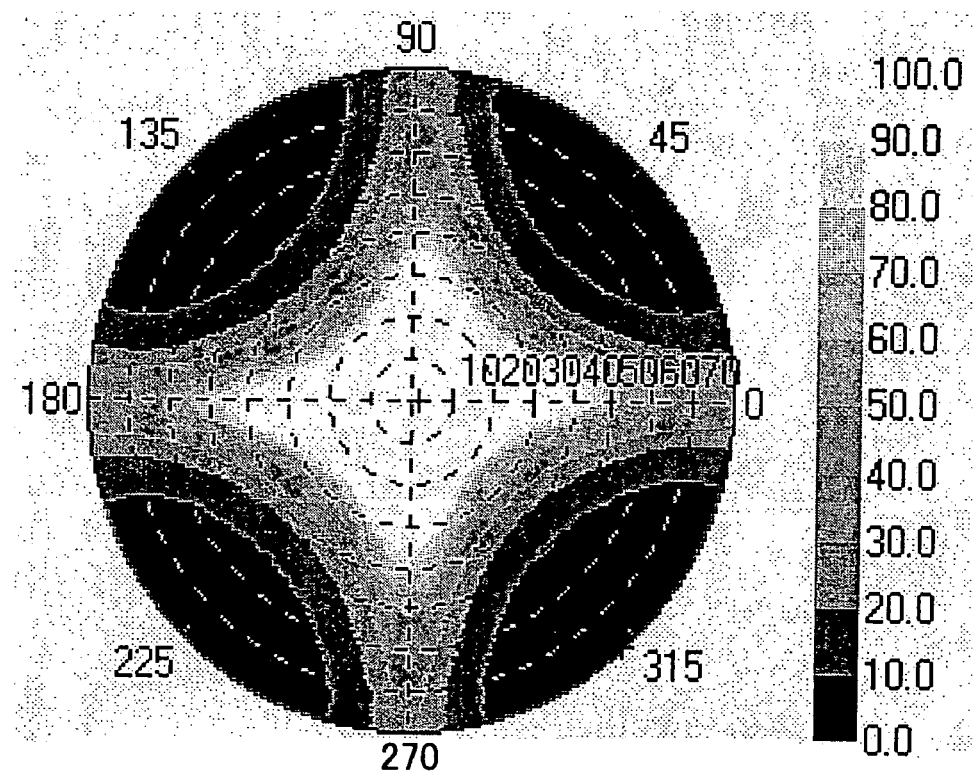
FIG. 3 shows a contrast curve of a liquid crystal panel of Comparative Example 1.

FIGS. 1 to 3 are contrast diagrams of liquid crystal panels including the birefringent films obtained in Examples 1 and 2 and Comparative Example 1, respectively. The contrast diagrams of the liquid crystal panels including the birefringent films obtained in Examples 3 and 4 were substantially the same as the contrast diagram in FIG. 1 of the liquid crystal panel including the birefringent film obtained in Example 1. In the figures, dark portions indicate contrast ratios of not more than 10.

The diagrams showed that the liquid crystal panels including the birefringent films obtained in Examples 1, 3 and 4 had excellent displaying contrast. As for the liquid crystal panel including the birefringent film obtained in Example 2, the displaying contrast thereof, while being degraded compared with the cases of Examples 1, 3 and 4, achieved a level that was practically permissible.

INDUSTRIAL APPLICABILITY

Thus, the manufacturing method according to the present invention is a method of manufacturing a birefringent film by which a birefringent film having a reduced thickness is manufactured in a reduced number of process steps. By employing the manufacturing method, the function of aligning a liquid crystal layer and the optically compensating function can be integrated in a non-liquid crystal polymer birefringent layer. As a result, excellent contrast is achieved without the need of further laminating a retardation plate. Further, by using a biaxial film to form the non-liquid crystal polymer birefringent layer, highly excellent contrast can be achieved.

The invention claimed is:

1. A method of manufacturing a birefringent film in which a liquid crystal compound birefringent layer is formed on a non-liquid crystal polymer birefringent layer, the liquid crystal compound birefringent layer being formed from an aligned liquid crystal compound, the non-liquid crystal polymer birefringent layer being formed from a non-liquid crystal polymer, comprising providing the non-liquid crystal polymer birefringent layer, wherein the non-liquid crystal polymer birefringent layer has been subjected to an aligning treatment so that it has an aligning property, the aligning treatment being one or both of stretching and shrinking, and forming the liquid crystal compound birefringent layer on the non-liquid crystal polymer birefringent layer such that, due to alignment of the non-liquid crystal polymer birefringent layer, the liquid crystal compound birefringent layer is treated to be aligned while being formed, wherein the non-liquid crystal polymer birefringent layer exhibits characteristics expressed by nx>ny>nz, where nx, ny and nz denote refractive indices in directions of an X axis, Y axis and Z axis in the non-liquid crystal polymer birefringent layer, respectively, the X axis denotes an axial direction presenting a maximum refractive index within a plane of the non-liquid crystal polymer birefringent layer, the Y axis denotes an axial direction perpendicular to the X axis within the plane, and the Z axis denotes a thickness direction perpendicular to the X axis and the Y axis, and wherein the liquid crystal compound birefringent layer is formed by coating a liquid crystal compound solution on the non-liquid crystal polymer birefringent layer that has been subjected to the aligning treatment.

2. The method according to claim 1, wherein the non-liquid crystal polymer is at least one polymer selected from the group consisting of polyamide, polyimide, polyester, polyetherketone, polyaryletherketone, polyamide imide, and polyesterimide.

3. The method according to claim 1, wherein the non-liquid crystal polymer birefringent layer has a thickness of not less than 1 μm to not more than 20 μm.

4. The method according to claim 1, wherein the non-liquid crystal polymer birefringent layer satisfies conditions represented by expressions (I) and (II) below, $$0 \text{ (nm)} \leq Re \leq 200 \text{ (nm)} \quad \text{(I)}$$

$$40 \text{ (nm)} \leq Rz \leq 800 \text{ (nm)} \quad \text{(II)}$$

where $Re=(nx-ny)\cdot d,$ $Rz=(nx-nz)\cdot d,$ nx, ny and nz denote refractive indices in directions of an X axis, Y axis and Z axis in the non-liquid crystal polymer birefringent layer, respectively, the X axis denotes an axial direction presenting a maximum refractive index within a plane of the non-liquid crystal polymer birefringent layer, the Y axis denotes an axial direction perpendicular to the X axis within the plane, the Z axis denotes a thickness direction perpendicular to the X axis and the Y axis, and d denotes a thickness of the non-liquid crystal polymer birefringent layer.

5. The method according to claim 1,
wherein the liquid crystal compound birefringent layer is formed by fixing an aligned liquid crystal compound.

6. The method according to claim 1,
wherein the liquid crystal compound comprises at least one liquid crystal compound selected from the group consisting of a liquid crystal polymer, a photopolymerizable liquid crystal monomer, and a thermally polymerizable liquid crystal monomer.

7. The method according to claim 6,
wherein the liquid crystal polymer is a nematic liquid crystal, a discotic liquid crystal, or a cholesteric liquid crystal.

8. The method according to claim 1,
wherein alignment of the liquid crystal compound is horizontal alignment, vertical alignment, twist alignment, hybrid alignment, homeotropic alignment, homogeneous alignment, tilt alignment, or focal conic alignment.

9. The method according to claim 1,
wherein the liquid crystal compound birefringent layer has an optical axis that is in a direction parallel or perpendicular to a plane, or inclined from the direction perpendicular to the plane.

10. A birefringent film that is manufactured by the method claimed in claim 1.

11. A birefringent film comprising a non-liquid crystal polymer birefringent layer and a liquid crystal compound birefringent layer, the liquid crystal compound birefringent layer being formed from an aligned liquid crystal compound and formed directly on the non-liquid crystal polymer birefringent layer,
wherein the non-liquid crystal polymer birefringent layer satisfies conditions represented by expressions (III) and (IV) below, $0\ (nm)\leq Re\leq 200\ (nm)$ (III)

$40\ (nm)\leq Rz\leq 800\ (nm)$ (IV)

where $Re=(nx-ny)\cdot d,$ $Rz=(nx-nz)\cdot d,$ nx, ny and nz denote refractive indices in directions of an X axis, Y axis and Z axis in the non-liquid crystal polymer birefringent layer, respectively, the X axis denotes an axial direction presenting a maximum refractive index within a plane of the non-liquid crystal polymer birefringent layer, the Y axis denotes an axial direction perpendicular to the X axis within the plane, the Z axis denotes a thickness direction perpendicular to the X axis and the Y axis, and d denotes a thickness of the non-liquid crystal polymer birefringent layer.

12. A polarizing plate with an optical compensation layer comprising a birefringent film,
wherein the birefringent film is the birefringent film claimed in claim 10.

13. A liquid crystal panel comprising a liquid crystal cell and an optical member, the optical member being arranged on at least one surface of the liquid crystal cell,
wherein the optical member is the birefringent film claimed in claim 10.

14. A liquid crystal display comprising a liquid crystal panel,
wherein the liquid crystal panel is the liquid crystal panel claimed in claim 13.

15. An image display comprising the birefringent film claimed in claim 10.

16. A polarizing plate with an optical compensation layer comprising a birefringent film,
wherein the birefringent film is the birefringent film claimed in claim 11.

17. A liquid crystal panel comprising a liquid crystal cell and an optical member, the optical member being arranged on at least one surface of the liquid crystal cell,
wherein the optical member is the birefringent film claimed in claim 11.

18. A liquid crystal panel comprising a liquid crystal cell and an optical member, the optical member being arranged on at least one surface of the liquid crystal cell,
wherein the optical member is the polarizing plate claimed in claim 12.

19. An image display comprising the birefringent film claimed in claim 11.

20. An image display comprising the polarizing plate claimed in claim 12.

21. The method according to claim 1,
wherein the non-liquid crystal polymer birefringent layer has a thickness of not less than 1 μm to not more than 10 μm, the liquid crystal compound birefringent layer is treated to be aligned while being formed, and exhibits characteristics expressed by nx>ny=nz, where nx, ny and nz denote refractive indices in directions of an X axis, Y axis and Z axis in the liquid crystal compound birefringent layer, respectively, the X axis denotes an axial direction presenting a maximum refractive index within a plane of the liquid crystal compound birefringent layer, the Y axis denotes an axial direction perpendicular to the X axis within the plane, and the Z axis denotes a thickness direction perpendicular to the X axis and the Y axis.

22. The method according to claim 21, wherein the liquid crystal compound is a nematic liquid crystal.

23. The method according to claim 21, wherein alignment of the liquid crystal comnound is homogeneous alignment.

24. The method according to claim 21, the birefringent film is a birefringent film for a vertical aligned mode liquid crystal display.

25. The method according to claim 21, wherein the non-liquid crystal polymer birefringent layer has a thickness of not less than 2 μm to not more than 10 μm.

26. The method according to claim 21, wherein the non-liquid crystal polymer birefringent layer is formed by coating a non-liquid crystal polymer solution or melt on a surface of a base and hardening it.

27. A birefringent film comprising a non-liquid crystal polymer birefringent layer and a liquid crystal compound birefringent layer, the liquid crystal compound birefringent layer being formed from an aligned liquid crystal compound and formed directly on the non-liquid crystal polymer birefringent layer, wherein the non-liquid crystal polymer birefringent layer has a thickness of not less than 1 μm to not more than 10 μm, and the liquid crystal compound birefringent layer exhibits characteristics expressed by nx>ny=nz, where nx, ny and nz denote refractive indices in directions of an X axis, Y axis and Z axis in the liquid crystal compound birefringent layer, respectively, the X axis denotes an axial direction presenting a maximum refractive index within a plane of the liquid crystal compound birefringent layer, the Y axis denotes an axial direction perpendicular to the X axis within the plane, and the Z axis denotes a thickness direction perpendicular to the X axis and the Y axis.

28. The birefringent film according to claim 27, wherein the non-liquid crystal polymer birefringent layer satisfies conditions represented by expressions (III) and (IV) below:

$$0 \, (nm) < Re \leq 200 \, (nm) \quad (III)$$

$$40 (nm) \leq Rz \leq 800 (nm) \quad (IV)$$

where $$Re = (nx-ny) \cdot d$$

$$Rz = (nx-nz) \cdot d,$$

nx, ny and nz denote refractive indices in directions of an X axis, Y axis and Z axis in the non-liquid crystal polymer birefringent layer, respectively, the X axis denotes an axial direction presenting a maximum refractive index within a plane of the non-liquid crystal polymer birefringent layer, the Y axis denotes an axial direction perpendicular to the X axis within the plane, the Z axis denotes a thickness direction perpendicular to the X axis and the Y axis, and d denotes a thickness of the non-liquid crystal polymer birefringent layer.

29. The birefringent film according to claim 27, wherein the birefringent film is for a vertical aligned mode liquid crystal display.

30. The birefringent film according to claim 27, wherein the non-liquid crystal polymer birefringent layer has a thickness of not less than 2 μm to not more than 10 μm.

31. The birefringent film according to claim 27, wherein the non-liquid crystal polymer birefringent layer is formed by coating a non-liquid crystal polymer solution or melt on a surface of a base and hardening it.

* * * * *